United States Patent
Sugiura et al.

(10) Patent No.: US 6,633,330 B1
(45) Date of Patent: Oct. 14, 2003

(54) COLOR CHARACTERISTIC MEASURING APPARATUS AND METHOD, AND STORAGE MEDIUM OF IMAGE PICKUP DATA

(75) Inventors: Hiroaki Sugiura, Tokyo (JP); Tetsuya Kuno, Tokyo (JP); Junichiro Hayashi, Hyogo (JP); Kiyotaka Yamamoto, Hyogo (JP); Yoshikuni Nishimura, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/319,872

(22) PCT Filed: Dec. 18, 1997

(86) PCT No.: PCT/JP97/04669

§ 371 (c)(1),
(2), (4) Date: Jun. 14, 1999

(87) PCT Pub. No.: WO98/28919

PCT Pub. Date: Jul. 2, 1998

(30) Foreign Application Priority Data

Dec. 24, 1996 (JP) ............................................. 8-343498

(51) Int. Cl.⁷ ............................................. H04N 17/00
(52) U.S. Cl. ........................ 348/188; 348/187; 348/180
(58) Field of Search ............................ 348/188, 187, 348/180, 175, 174, 181, 182, 189, 223, 263, 335; 356/243.1, 243.5; 324/770; 351/239, 244, 243, 213, 214

(56) References Cited

U.S. PATENT DOCUMENTS

| | | | | |
|---|---|---|---|---|
| 4,212,520 A | * | 7/1980 | Klimsa | 351/243 |
| 4,575,124 A | * | 3/1986 | Morrison | 283/115 |
| 4,628,342 A | * | 12/1986 | Desmons et al. | 348/188 |
| 4,779,136 A | 10/1988 | Corley | 348/188 |
| 5,760,829 A | * | 6/1998 | Sussmeier | 348/187 |
| 5,805,218 A | * | 9/1998 | Ohura et al. | 348/353 |
| 5,821,993 A | * | 10/1998 | Robinson | 348/187 |
| 5,917,541 A | * | 6/1999 | Nakagome et al. | 348/93 |
| 6,016,161 A | * | 1/2000 | Robinson | 348/187 |

FOREIGN PATENT DOCUMENTS

| | | |
|---|---|---|
| JP | 5844359 | 11/1983 |
| JP | 122708 | 5/1993 |
| JP | 5122708 | 5/1993 |
| JP | 795458 | 4/1995 |
| JP | 7222206 | 8/1995 |

OTHER PUBLICATIONS

"International Standard IEC 1146–1 Video Cameras PAL/SECAM/NTSC)—Method of Measurement—Part 1: Non-broadcasting single sensor cameras", Section 3, Clause 18, May 1994, IEC (International Electrotechnical Commission).

Japanese Industrial Standard JIS Z 8722.

"Intercooler Profile Format," Intercolor Consortium, version 3.0, Jun. 10, 1994.

* cited by examiner

*Primary Examiner*—John Miller
*Assistant Examiner*—Jean W. Désir
(74) *Attorney, Agent, or Firm*—Birch, Stewart, Kolasch & Birch, LLP

(57) ABSTRACT

It is an object of the invention to measure the precise color characteristic of an image pickup machine and accurately reproduce a subject in an image display unit.

A color characteristic measurement apparatus which has a test chart (1) as a subject of an image pickup machine (6), a hole (2) made in the test chart (1), a black box (3) placed on a rear face of the test chart (1) and formed on an inner surface in black, and a light output section (4) placed in the black box (3) at a position where the light output section (4) can be observed through the hole (2) from the outside.

33 Claims, 27 Drawing Sheets

4: LIGHT SOURCE
5: ILLUNIMATION LIGHT SOURCE
6: IMAGE PICKUP MACHINE
7: APPLIED LIGHT

1: TEST CHART
2: HOLE
3: BLACK BOX

4: LIGHT SOURCE
5: ILLUNIMATION LIGHT SOURCE
6: IMAGE PICKUP MACHINE
7: APPLIED LIGHT

9: ATTENUATOR

8: SPECIAL LIGHT SOURCE

10: FILTER

11: OPTICAL FIBER
12: LIGHT SOURCE UNIT

13: DIFFUSER PANEL

10: FILTER

10: FILTER

13: DIFFUSER PANEL

13: DIFFUSER PANEL

14: GRAY SCALE

15: COLOR CHART

16: HOLE

17: STANDARD WHITE COLOR CHART

| REFLECTIVITY | (COLOR CHART) | OUTPUT DATA |||
| --- | --- | --- | --- | --- |
| | | R | G | B |
| 0.0 | (COLOR CHART 1) | 2 | 2 | 2 |
| 2.0 | (COLOR CHART 2) | 10 | 10 | 11 |
| 4.0 | (COLOR CHART 3) | 15 | 15 | 14 |
| 6.0 | (COLOR CHART 4) | 20 | 19 | 19 |
| 8.0 | (COLOR CHART 5) | 25 | 24 | 23 |
| 10.3 | (COLOR CHART 6) | 31 | 30 | 31 |
| 14.7 | (COLOR CHART 7) | 41 | 40 | 37 |
| 19.8 | (COLOR CHART 8) | 50 | 49 | 45 |
| 25.8 | (COLOR CHART 9) | 60 | 58 | 56 |
| 32.5 | (COLOR CHART 10) | 67 | 66 | 62 |
| 39.9 | (COLOR CHART 11) | 75 | 73 | 70 |
| 48.1 | (COLOR CHART 12) | 81 | 80 | 76 |
| 57.0 | (COLOR CHART 13) | 87 | 85 | 81 |
| 66.6 | (COLOR CHART 14) | 92 | 90 | 86 |
| 77.0 | (COLOR CHART 15) | 95 | 94 | 92 |
| 88.1 | (COLOR CHART 16) | 97 | 96 | 95 |

| WAVELENGTH (nm) | OUTPUT DATA R | G | B |
|---|---|---|---|
| 380 | 1 | 1 | 5 |
| 385 | 0 | 1 | 8 |
| 390 | 2 | 2 | 12 |
| ⋮ | ⋮ | ⋮ | ⋮ |
| 580 | 10 | 68 | 20 |
| 585 | 13 | 75 | 12 |
| 590 | 8 | 80 | 11 |
| ⋮ | ⋮ | ⋮ | ⋮ |
| 770 | 2 | 1 | 0 |
| 775 | 1 | 0 | 0 |
| 780 | 2 | 0 | 0 |

WAVELENGTH λ

WAVELENGTH λ

WAVELENGTH λ

18: STORAGE UNIT

γ CHARACTERISTIC OF
IMAGE DISPLAY UNIT

γ CHARACTERISTIC OF
IMAGE PICKUP MACHINE

DATA FORMAT EXAMPLE 1

DATA FORMAT EXAMPLE 2

DATA FORMAT EXAMPLE 1

DATA FORMAT EXAMPLE 2

COLOR CHARACTERISTIC MEASURING APPARATUS AND METHOD, AND STORAGE MEDIUM OF IMAGE PICKUP DATA

This application is the national phase under 35 U.S.C. §371 of PCT International Application No. PCT/JP97/04669 which has an International filing date of Dec. 18, 1997, which designated the United States of America.

TECHNICAL FIELD

This invention relates to a color characteristic measurement apparatus, a color characteristic measurement method, and an image pickup data storage medium and in particular to an apparatus and a method for measuring the color characteristic of an image pickup machine such as a digital video camera or a digital still camera or measuring and correcting the color characteristic and a storage medium for storing image data picked up by an image pickup machine.

BACKGROUND OF THE INVENTION

A typical color characteristic measurement apparatus and method of an image pickup machine in a related art are shown in Section 3, Clause 18 of "International Standard IEC 1146-1 Video cameras (PAL/SECAM/NTSC)—Method of Measurement—Part 1: Non-broadcasting single sensor cameras" published in May 1994 by IEC (International Electrotechnical Commission) as international standard.

FIG. 48 is a drawing to show the configuration of an apparatus for measuring color and gradation characteristics of a digital still camera which is used as an example of an image pickup machine, as application of such a measurement apparatus and method in the related art. In the figure, numeral 6 denotes an image pickup machine such as a digital still camera whose color characteristic is to be measured, numeral 1 denotes a test chart of a subject of the image pickup machine 6, numeral 5 denotes an illumination light source having stable illumination intensity and color temperature for illuminating the test chart 1, and numeral 19 denotes a computer for receiving data output from the image pickup machine 6.

FIG. 49 is a format drawing of the test chart 1 containing white, black, a gray scale 200 changing gradually from white to black, and several color charts 210 of red, green, blue, etc., as reference colors. As examples of these color charts, the characteristics are defined in Annex A and Annex B of the above-mentioned international standard.

First, the R, G, and B values of the color charts 210 of the test chart 1 shown in FIG. 49 are assumed to be already known and are adopted as theoretical values. For example, if data consists of eight bits, ideally R=255 and G=B=0 for red, G=255 and R=B=0 for green, and B=255 and R=B=0 for blue.

Next, the differences between the R, G, and B values corresponding to the color charts 210 measured when an image of the test chart 1 is picked up by the image pickup machine 6 and the theoretical R, G, and B values (color differences) are found, whereby the color reproducibility of the image pickup machine 6 can be evaluated.

The gradation characteristic of the image pickup machine 6 can be found from the measurement values provided when the gray scale 200 changing gradually from white to black is imaged by the image pickup machine 6.

However, the illumination intensity and chromaticity on the face of the test chart illuminated by the illumination light source vary from one position to another. Thus, if a photograph of the same color chart is taken, the measurement value varies depending on the position on the test chart and unless illumination intensity and chromaticity inconsistencies are corrected, precise values cannot be provided.

If a photograph of the same color chart is taken even under ideal uniform illumination, the measurement value varies depending on the characteristics of the image pickup optical system of the image pickup machine, for example, because of the light quantity difference between the center and peripheral portions. Thus, unless the characteristics of the image pickup optical system of the image pickup machine are already known and are used to correct the measurement values, precise values cannot be provided.

To take a photograph of the test chart at a place where the characteristics of the image pickup optical system of the image pickup machine are the same, the test chart must be moved or replaced or the image pickup machine must be moved.

Some image pickup machines have automatic correction functions of an automatic exposure function, an automatic gain correction function, an automatic white balance correction function, etc. If a subject changes, a correction is made according to the setting responsive to the subject, thus a photograph of a different subject cannot be taken under the same setup conditions.

Although the color differences between the measurement values of the R, G, and B values corresponding to the color charts on the test chart and the theoretical R, G, and B values can be found, the spectral sensitivity characteristic of the image pickup machine as the basis of color management cannot be measured.

The test chart used as a subject usually is printed matter and it is difficult to generate black with reflectivity close to 0% and white with reflectivity close to 100%, thus the maximum value and minimum value of measurement data cannot be corrected. Since the test chart is printed matter, change with time, such as color deterioration or color change, is involved, thus measurement with high reproducibility is hard to execute.

Only with limited types of images picked up by the image pickup machine, the color difference from any other general subject is not seen.

Only with information provided from limited types of images picked up by the image pickup machine, a highly accurate color correction cannot be made to the image of any other general subject.

To relate measurement data of color characteristic measurement apparatus to the images picked up by the image pickup machine, work such as preparation of an additional correspondence table becomes necessary.

If the type of illumination light source (spectral distribution characteristic) changes, the data corresponding to each color chart imaged by the image pickup machine also changes. However, means for accurately reflecting the characteristic of each illumination light source is not provided in related art, thus color management of the image pickup machine containing the illumination light source is hard to accomplish. Particularly, there is not a method of correctly measuring the spectral sensitivity characteristic of the image pickup machine for the reason as described above, thus if the spectral sensitivity characteristic of a light source, etc., is measured accurately, it does not lead to color management making the effective use of the spectral sensitivity characteristic.

DISCLOSURE OF THE INVENTION

According to the invention, there is provided a color characteristic measurement apparatus comprising a test chart as a subject, a hole being made in the test chart, a black box being placed on a rear face of the test chart and formed on an inner surface in black, and a light output section being placed in the black box at a position where the light output section can be observed through the hole from the front of the test chart.

The test chart occupies most of the photograph taking range of an image pickup machine as compared with the hole made in the test chart. Thus, output light of the light output section can be changed while automatic correction functions are fixed.

If applied light from an illumination light source of the test chart is incident on the black box through the hole, it is absorbed in the black box and is not reflected; it is not emitted again through the hole. Thus, output light from the light output section can be observed without being affected by the external environments.

According to the invention, there is provided a color characteristic measurement method comprising the steps of providing a color characteristic measurement apparatus and an illumination light source, placing the color characteristic measurement apparatus and the illumination light source so that light applied from the illumination light source is not applied to a light output section in a black box, imaging a test chart of the color characteristic measurement apparatus by an image pickup machine, and finding a color characteristic of the image pickup machine based on first data corresponding to the area of the light output section, extracted from picked up image data or second data provided by performing operation on the first data.

Thus, output light from the light output section not affected by the external illumination light source can be observed while automatic correction functions are fixed.

According to the invention, there is provided a picked up image data storage medium for adding to image data provided by an image pickup machine the gradation characteristic and the spectral sensitivity characteristic of the image pickup machine or the data provided by performing operation on the gradation and spectral sensitivity characteristics and storing the image data.

Thus, the subject can be reproduced precisely in an image display unit without being affected by the color characteristic of the image pickup machine.

BRIEF DESCRIPTION OF THE DRAWINGS

In the accompanying drawings:

FIG. 28 is a drawing to show another example of a picked up image with a color chart inserted into the test chart;

BEST MODE FOR CARRYING OUT THE INVENTION

Referring now to the accompanying drawings, there are shown preferred embodiments of the invention.

First Embodiment

As a first embodiment of the invention, a color characteristic measurement apparatus for fixing the action of the automatic correction function of an image pickup machine and measuring the color characteristic thereof will be discussed.

Figure 1:
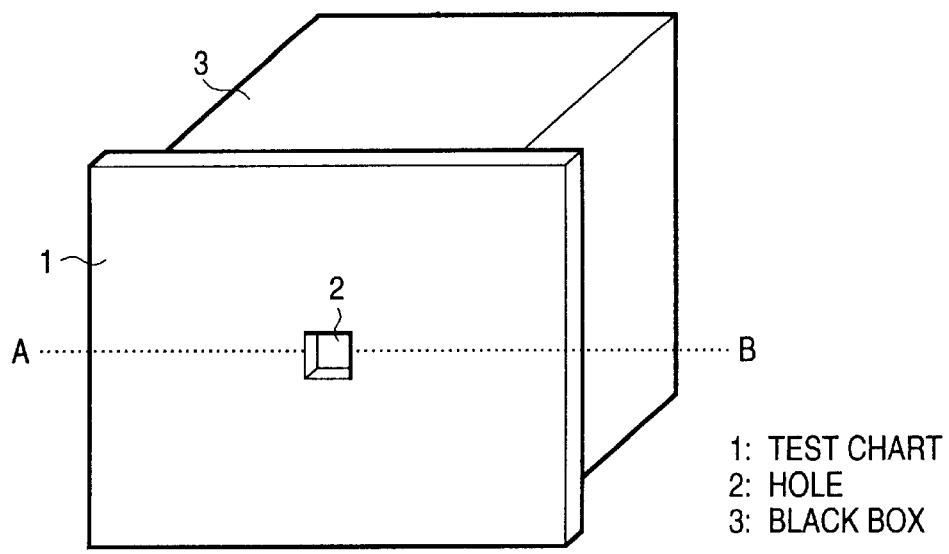
FIG. 1 is an external view of an example of a color characteristic measurement apparatus of a first embodiment of the invention.
Figure 2:
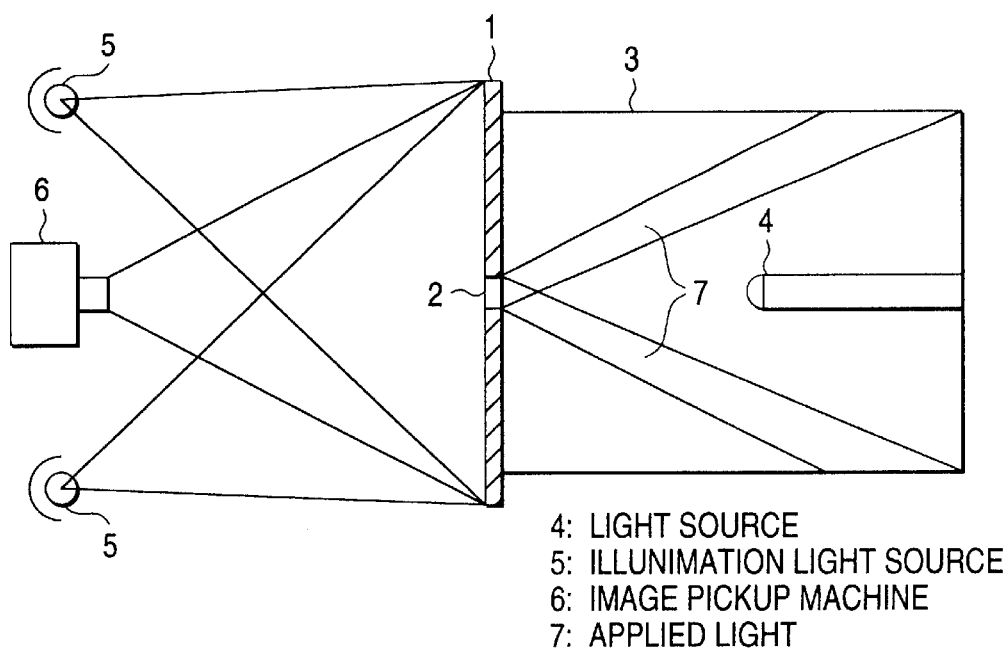
FIG. 2 is a sectional view of the color characteristic measurement apparatus in FIG. 1 taken on a plane perpendicular to a test chart 1 containing a dashed line AB.

FIG. 1 is an external view of an example of the color characteristic measurement apparatus of the first embodiment of the invention. FIG. 2 is a sectional view of the color characteristic measurement apparatus in FIG. 1 taken on a plane perpendicular to a test chart 1 containing a dashed line AB.

In the figures, numeral 1 denotes a test chart used as a subject, numeral 2 denotes a hole which is made in the test chart 1 and is sufficiently small relative to the area of the test chart 1, numeral 3 denotes a black box whose inside is painted in black, numeral 4 denotes a light output section that can be observed through the hole 2, numeral 5 denotes an illumination light source having a stable color temperature, numeral 6 denotes an image pickup machine of a test specimen whose color characteristic is to be measured, and numeral 7 denotes applied light incident on the black box 3 through the hole 2. The light output section 4 is formed of a light source in the embodiment, but may be a light emission end for emitting light from an external light source.

The inner walls of the black box 3 are set to sufficiently low reflectivity and the applied light 7 incident on the black box 3 through the hole 2 from the outside is absorbed on the inner walls and is not reflected; it is not emitted again through the hole 2. Thus, if the light source 4 is not provided in the black box 3 and the hole 2 is observed from the outside, a state close to optically complete black can be observed. Therefore, the light source 4 is placed at a position where observation can be made through the hole 2 from the outside, whereby only output light of the light source 4 not affected by the applied light 7 can be observed.

The image pickup machine 6 picks up the test chart 1 containing light of the light source 4 peeped from the hole 2. At this time, for example, if the image pickup machine 6 is a digital still camera, the color characteristic of the image pickup machine 6 can be measured by obtaining the pixel value at the position corresponding to the light source 4 on the picked up image when the light source 4 is changed.

Generally, the image pickup machine 6 has automatic correction functions of an automatic exposure function, an automatic gain correction function, an automatic white balance correction function, etc. Thus, if light source light whose characteristic changes is imaged as a subject, the automatic correction functions operate and the exposure conditions, etc., change; it is difficult to measure the precise color characteristic of the image pickup machine 6 using the image data.

Then, in the embodiment, the color characteristic measurement apparatus is provided with the test chart 1 occupying most of the photograph taking range of the image pickup machine 6 as compared with the hole 2. Thus, the automatic correction functions work only for the test chart 1 and can be fixed without being affected by change in the light source 4. That is, the test chart 1 and the illumination light sources 5 for applying light to the test chart 1 as external environments are fixed, whereby the automatic correction functions can be excluded.

Using the color characteristic measurement apparatus, the light source 4 can be used as a measurement object of the image pickup machine and the measurement position can be fixed. Thus, the characteristics of the optical system of the image pickup machine such as illumination inconsistencies and light quantity nonuniformity depending on the image pickup area position like a cosine fourth-power law, for example, need not be considered. Particularly, for a consumer-oriented image pickup machine which has various automatic correction functions, but not a function of invalidating or fixing the automatic correction functions, subjects of various characteristics can be set without changing the automatic correction functions.

Second embodiment

As a second embodiment of the invention, a color characteristic measurement apparatus for measuring the gradation characteristic of an image pickup machine will be discussed.

Figure 3:
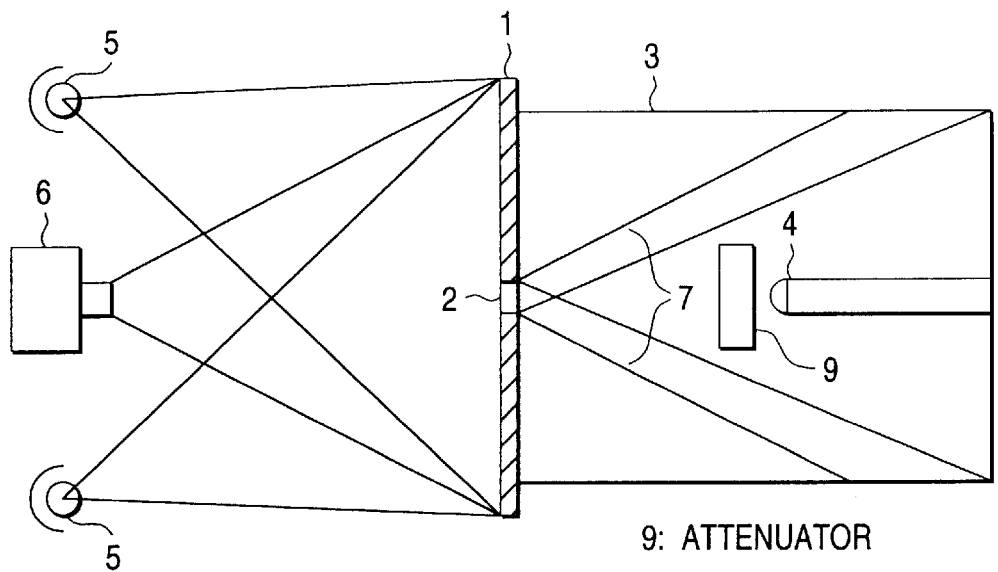
FIG. 3 is a sectional view to show a configuration example of a color characteristic measurement apparatus of a second embodiment of the invention.

FIG. 3 is a sectional view to show a configuration example of the color characteristic measurement apparatus of the second embodiment of the invention. In the color characteristic measurement apparatus, an attenuator is mounted preceding a light output section 4 so that output light of the light output section 4 can be changed in specific light quantity steps. According to the second embodiment, the attenuator 9 is adjusted, whereby light of any desired light quantity can be observed through a hole 2.

Thus, if a test chart 1 containing the hole 2 is imaged by an image pickup machine 6 as in the first embodiment, the color characteristic of the image pickup machine 6 in any desired light quantity can be measured. That is, the light quantity of output light of the light output section 4 is changed to any desired value by the attenuator 9 and the characteristics of the image pickup machine 6 at the time are measured, whereby the gradation characteristic of the image pickup machine 6 can be measured precisely and easily.

A neutral-density filter, etc., is preferred as the attenuator 9 for measuring the gradation characteristic of the image pickup machine. In the second embodiment, the attenuator 9 is provided preceding the light output section 4, but if the light output section 4 is an emission end of light, a similar advantage is also provided if the attenuator 9 is placed at a point between a light source and the emission end of light. A similar advantage is also provided if the light quantity is changed by a light source with a dimmer function.

Third Embodiment

As a third embodiment of the invention, a color characteristic measurement apparatus for measuring the spectral sensitivity characteristic of an image pickup machine using a spectral light source will be discussed.

Figure 4:
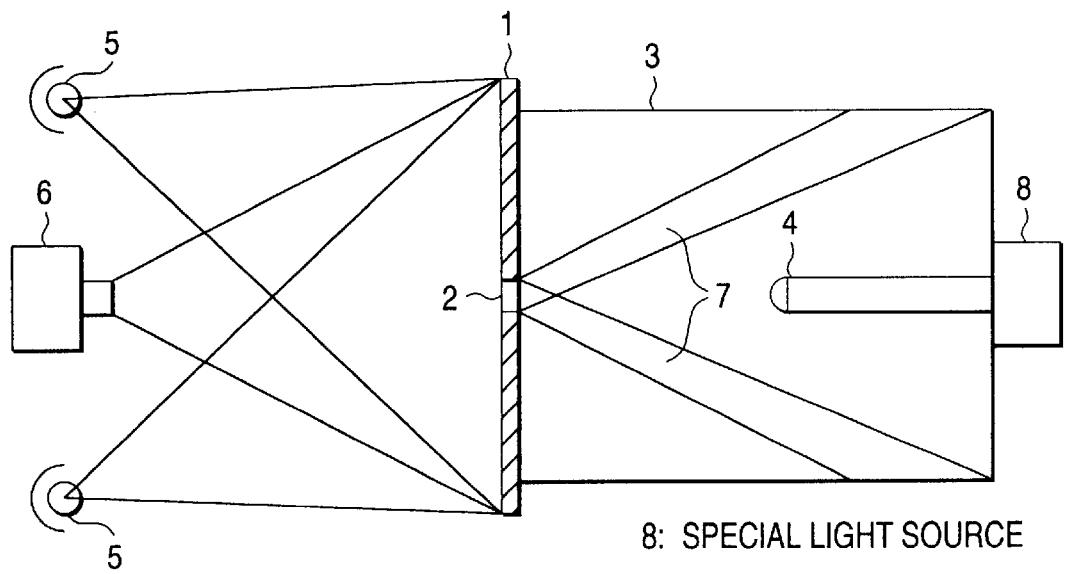
FIG. 4 is a sectional view to show a configuration example of a color characteristic measurement apparatus of a third embodiment of the invention.

FIG. 4 is a sectional view to show a configuration example of the color characteristic measurement apparatus of the third embodiment of the invention. In the color characteristic measurement apparatus, a spectral light source 8 is attached to a light output section 4 for emitting a spectrum of output light of the light source. According to the third embodiment, the wavelength of light output from the spectral light source 8 is set, whereby spectrum of any desired wavelength can be observed through a hole 2. The spectral light source 8 generally is made up of a lamp such as a halogen lamp and a spectroscope.

According to the third embodiment, a test chart 1 containing the hole 2 is imaged by an image pickup machine 6 as in the first embodiment, whereby the characteristics of the image pickup machine 6 relative to light of any desired wavelength can be measured without being affected by various automatic functions. Thus, the wavelength of light output from the light output section 4 is changed by the spectral light source 8 and the characteristics of the image pickup machine 6 at the time are measured, whereby the spectral sensitivity characteristic of the image pickup machine 6 can be measured precisely and easily. The wavelength may be represented as barycentric wavelength.

If the color characteristic measurement apparatus is configured so that output light of the light output section 4 can be changed in specific wavelength steps with respect to a specific wavelength range by the spectral light source 8, the spectral sensitivity characteristic of the image pickup machine 6 can be provided with higher practicality.

If the spectral wavelength range of the spectral light source 8 is set to a visible light range, the spectral sensitivity characteristic of the image pickup machine 6 fitted to the visual characteristics of human beings can be provided.

The wavelength range is set in the range of 380 nm to 780 nm, whereby the spectral sensitivity characteristic of the image pickup machine 6 can be provided matching a first-kind spectral measuring instrument conforming to Japanese Industrial Standard JIS Z 8722, for example.

Figure 5:
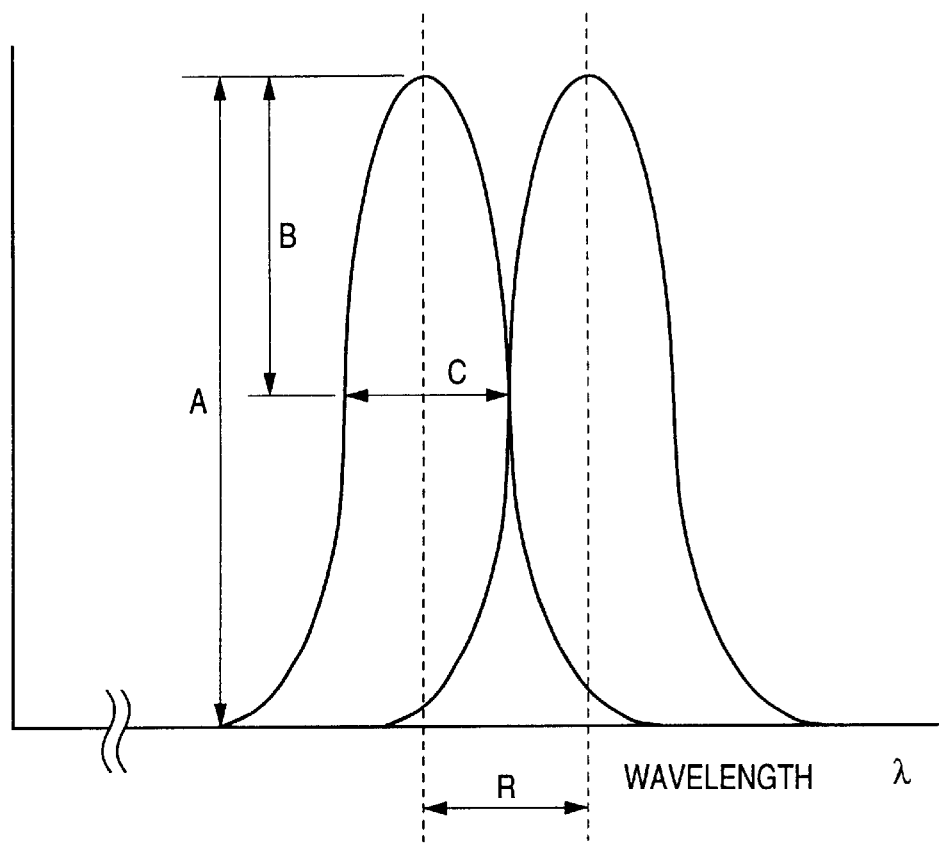
FIG. 5 is a drawing to show an example of the spectral characteristic of the color characteristic measurement apparatus of the third embodiment of the invention.

Further, if the wavelength steps are set so that half-value widths of spectral light become equal, namely, width C in B which is one-half a wave height A in FIG. 5 and wavelength step R become equal as shown in a waveform chart of FIG. 5, the wavelength components overlap almost the same. Thus, the spectral sensitivity characteristic of the image pickup machine 6 can be provided with less lost information and less overlapped information relative to the measurement wavelength range. The half-value width may be represented as effective wavelength width.

Fourth Embodiment

As a fourth embodiment of the invention, a color characteristic measurement apparatus for measuring the spectral sensitivity characteristic of an image pickup machine using a spectral filter will be discussed.

Figure 6:
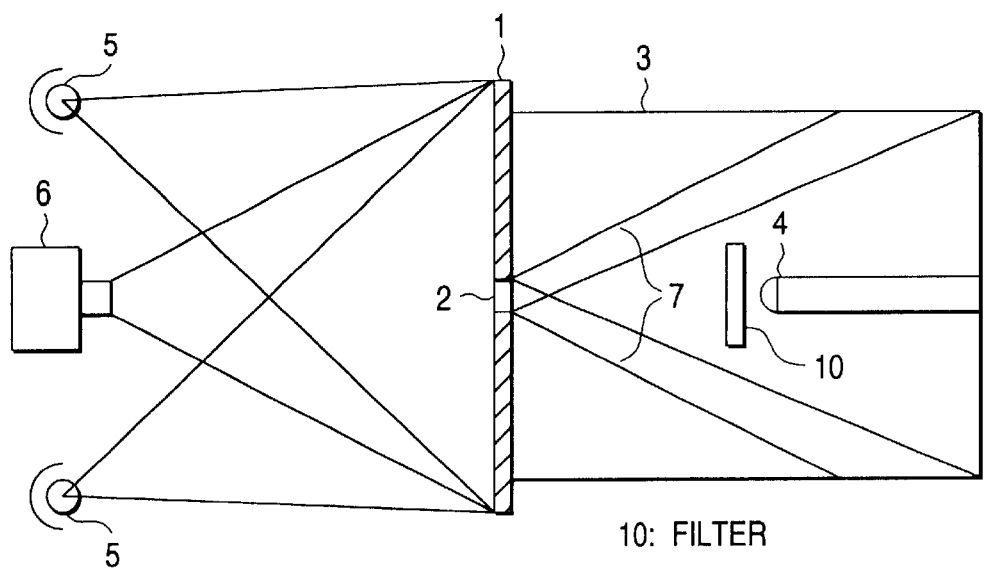
FIG. 6 is a sectional view to show a configuration example of a color characteristic measurement apparatus of a fourth embodiment of the invention.

FIG. 6 is a sectional view to show a configuration example of the color characteristic measurement apparatus of the fourth embodiment of the invention. The color characteristic measurement apparatus comprises a filter 10 having a specific spectral transmission factor characteristic placed in front of a light output section 4.

Light that can be observed through a hole 2 is only light of output light of the light output section 4 passing through the filter 10. The spectral transmission factor characteristic of the filter 10 can be changed by replacing the filter 10. Therefore, light observed through the hole 2 can be made light of any desired spectral distribution characteristic.

Fifth Embodiment

As a fifth embodiment of the invention, a color characteristic measurement apparatus using an external light source will be discussed.

Figure 7:
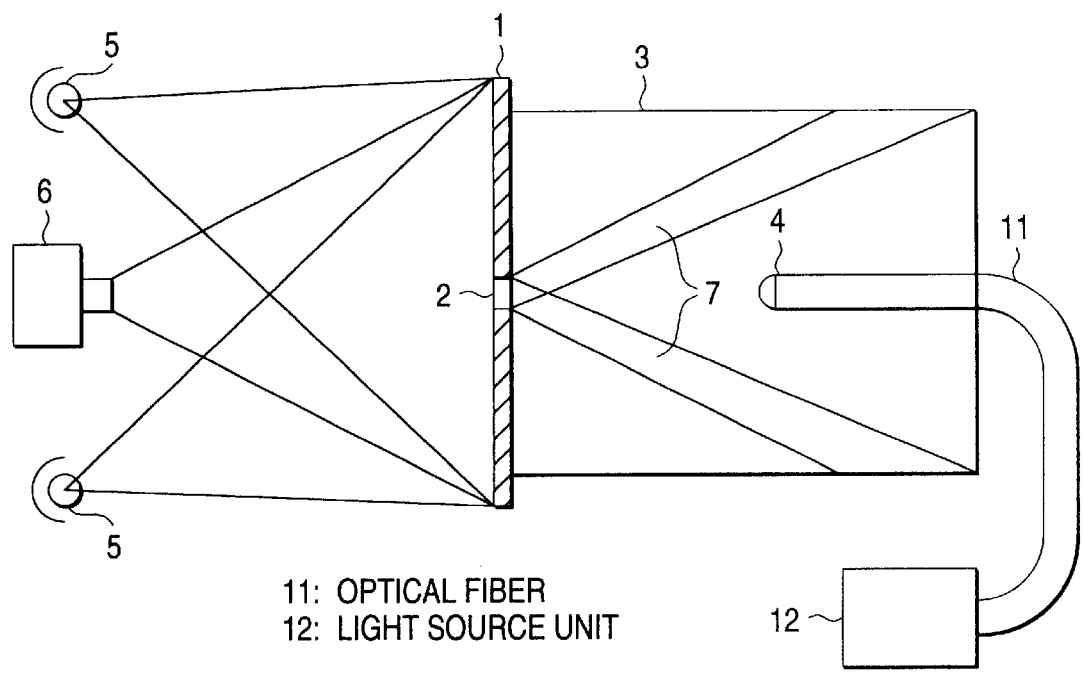
FIG. 7 is a sectional view to show a configuration example of a color characteristic measurement apparatus of a fifth embodiment of the invention.

FIG. 7 is a sectional view to show a configuration example of the color characteristic measurement apparatus of the fifth embodiment of the invention. In the figure, numeral 11 denotes an optical fiber and numeral 12 denotes a light source unit such as a lamp house. The color characteristic measurement apparatus has the light source unit 12 separated from a black box 3. According to the fifth embodiment, light of the light source unit 12 at an outside position distant from the apparatus is guided through the optical fiber 11 into the equipment and can be measured as output light from a light output section 4. Silica glass, etc., is preferred as a material of the optical fiber 11 if wavelength light of 400 nm or less is to be measured.

The configuration of the color characteristic measurement apparatus is useful if the light source is of large size as compared with the black box 3 or requires heat radiation. In FIG. 7, the optical fiber is shown as a typical optical waveguide device, but a similar advantage can be provided if any other optical waveguide device is used.

Sixth Embodiment

As a sixth embodiment of the invention, a color characteristic measurement apparatus using a diffuser panel for decreasing a measurement error will be discussed.

Figure 8:
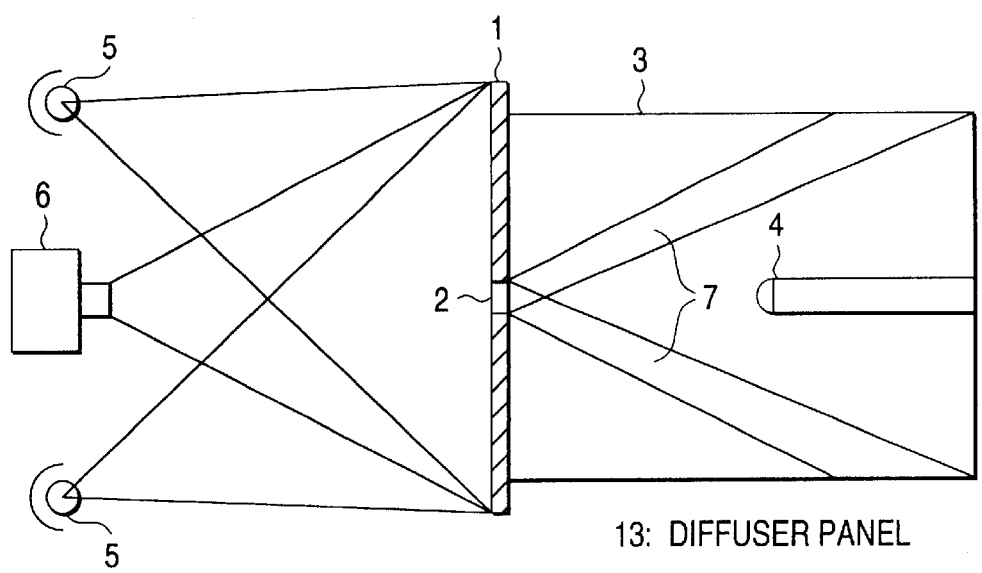
FIG. 8 is a sectional view to show a configuration example of a color characteristic measurement apparatus of a sixth embodiment of the invention.

FIG. 8 is a sectional view to show a configuration example of the color characteristic measurement apparatus of the sixth embodiment of the invention. In the figure, numeral 13 denotes a diffuser panel, which is placed in front of a light output section 4 for diffusing light.

Figure 9:
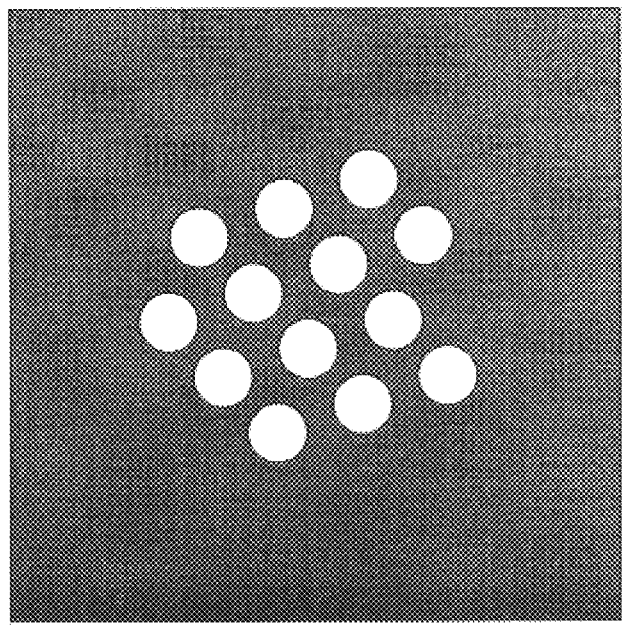
FIG. 9 is a drawing to show image data provided when a diffuser panel is not placed in the sixth embodiment of the invention.

FIG. 9 is an enlarged view of the portion of the light output section 4 with respect to image data picked up by an image pickup machine 6 with the diffuser panel 13 not placed. Generally, in the color characteristic measurement apparatus for packing up an image of a light source or an optical fiber emission end, the pixel values of image data of the light output section 4 vary, as shown in FIG. 9, due to the effects of change in the optical axis, the light quantity difference in minute areas of the light source, etc., resultantly, the measurement values contain many errors.

Figure 10:
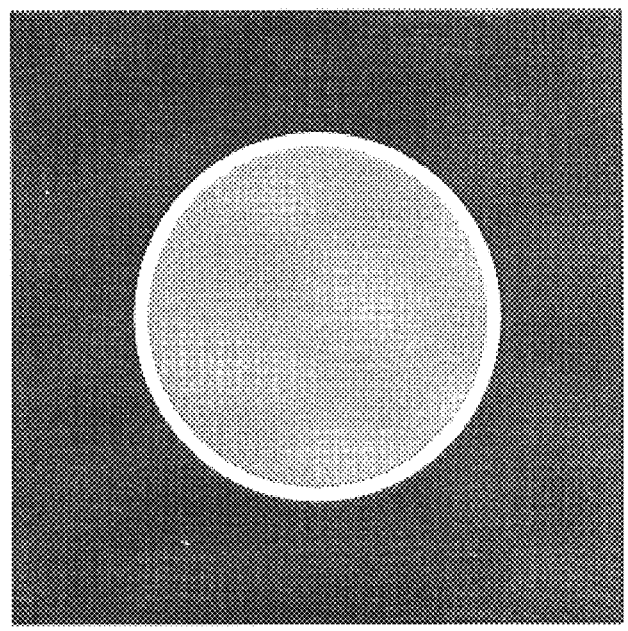
FIG. 10 is a drawing to show image data provided when a diffuser panel is placed in the sixth embodiment of the invention.

However, output light of the light source 4 can be diffused by placing the diffuser panel 13 in front of light of the light output section 4, so that light of the light output section 4 observed through a hole 2 becomes averaged light as shown in FIG. 10 with the error causes excluded. That is, the light output section 4 observed through the hole 2 can be made a uniform surface light source and measurement accuracy can be enhanced.

Seventh Embodiment

As a seventh embodiment of the invention, a color characteristic measurement apparatus for adding an offset to the output light quantity of a light output section 4 and measuring the spectral sensitivity of an image pickup machine will be discussed.

Figure 11:
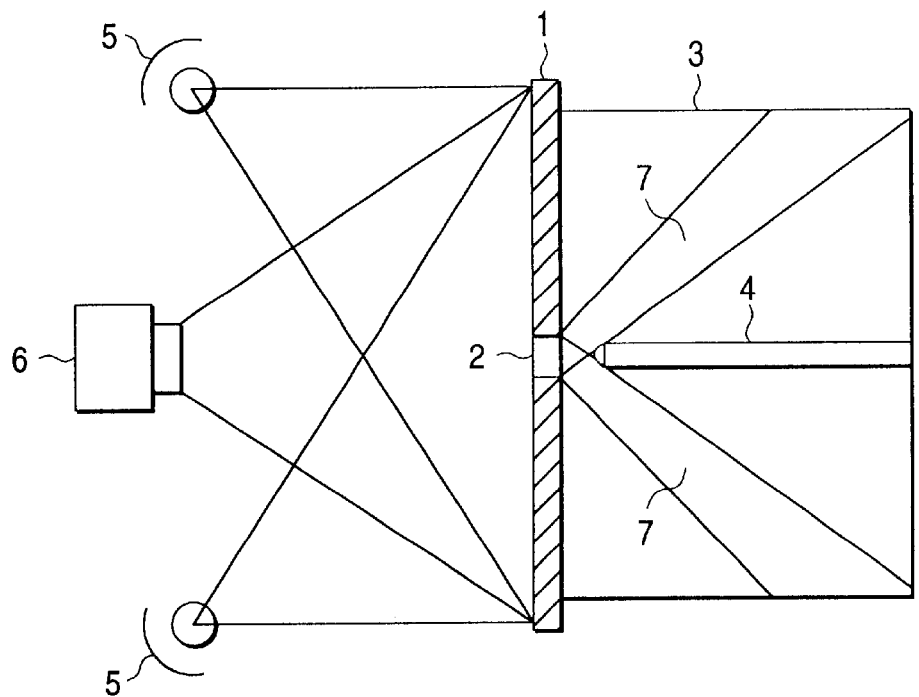
FIG. 11 is a drawing to show a configuration example of a color characteristic measurement apparatus of a seventh embodiment of the invention.

FIG. 11 is a drawing to show a configuration example of the color characteristic measurement apparatus of the seventh embodiment of the invention. The color characteristic measurement apparatus is the same as that shown in FIG. 2 for emitting light from a spectral light source (not shown) through the light output section 4 except that the light output section 4 is placed nearer to a hole 2 in a test chart 1 so that illumination light sources 5 illuminate the light output section 4 in a black box 3.

The inner walls of the black box 3 are set to sufficiently low reflectivity and most of applied light 7 incident on the black box 3 from the illumination light sources 5 is absorbed on the inner walls of the black box 3 and is not reflected; it is not emitted again through the hole 2. Therefore, an offset as much as the reflected light quantity of the applied light 7 reflected on the light output section 4 is added to the output light quantity from the light output section 4.

Figure 13:
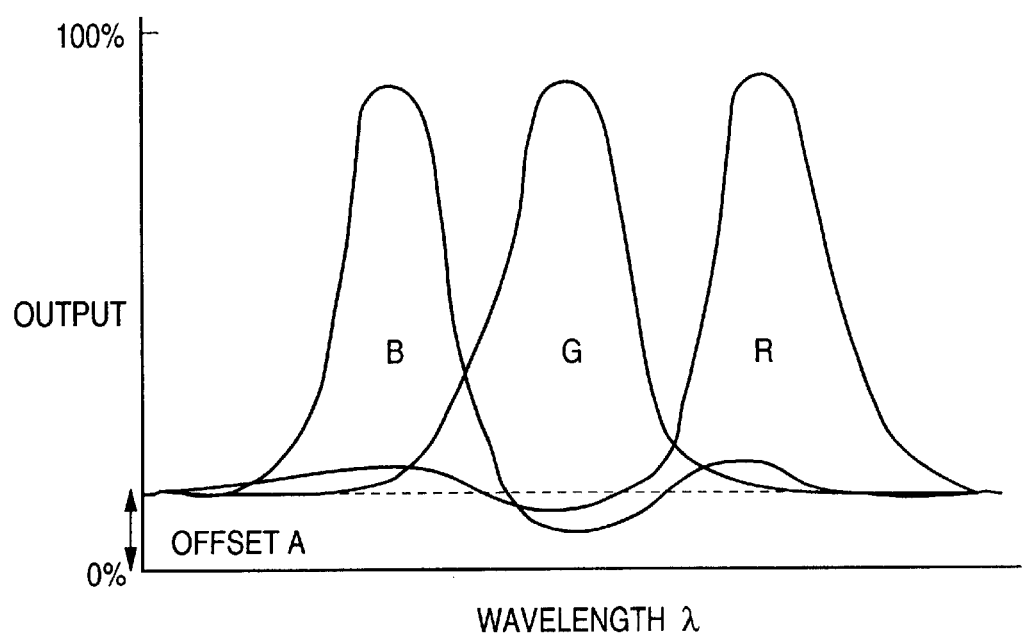
FIG. 13 is a drawing to show an example of the measurement result of spectral sensitivity containing an offset.

FIG. 13 shows the spectral sensitivity characteristic of an image pickup machine 6 measured by the color characteristic measurement apparatus. Offset A in the figure denotes the offset applied from the illumination light sources 5. After the spectral sensitivity characteristic shown in FIG. 13 is provided, the offset is subtracted therefrom, whereby the spectral sensitivity characteristic of the image pickup machine 6 is provided as shown in FIG. 14.

Figure 14:
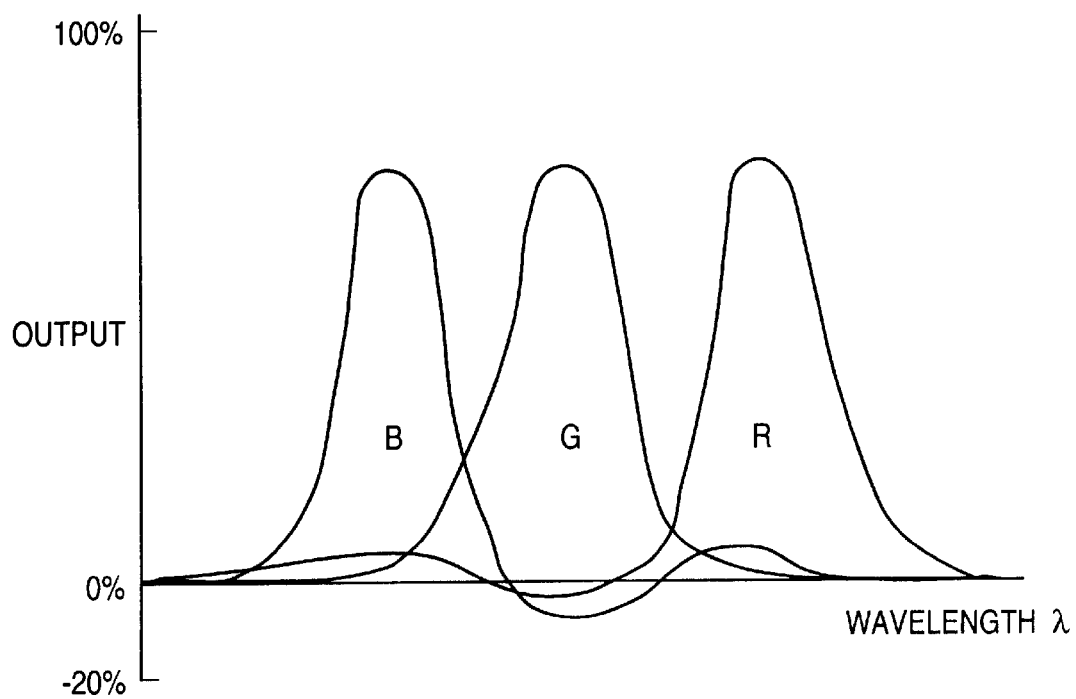
FIG. 14 is a drawing to show an example of the spectral sensitivity characteristic of an image pickup machine found by subtracting the offset from the measurement result shown in FIG. 13.

The spectral sensitivity characteristic shown in FIG. 14 contains a negative component. Formerly, it was difficult to precisely measure such a characteristic of the image pickup machine. Using the color characteristic measurement apparatus, an offset is added to the output light quantity from the light output section 4 and the spectral sensitivity characteristic of the image pickup machine is measured, whereby precise measurement can also be made on the negative component contained in such a spectral sensitivity characteristic.

The offset shown in FIG. 13, offset A, is a value corresponding to the light quantity found by observing the light output section 4 with no light output therefrom.

Figure 12:
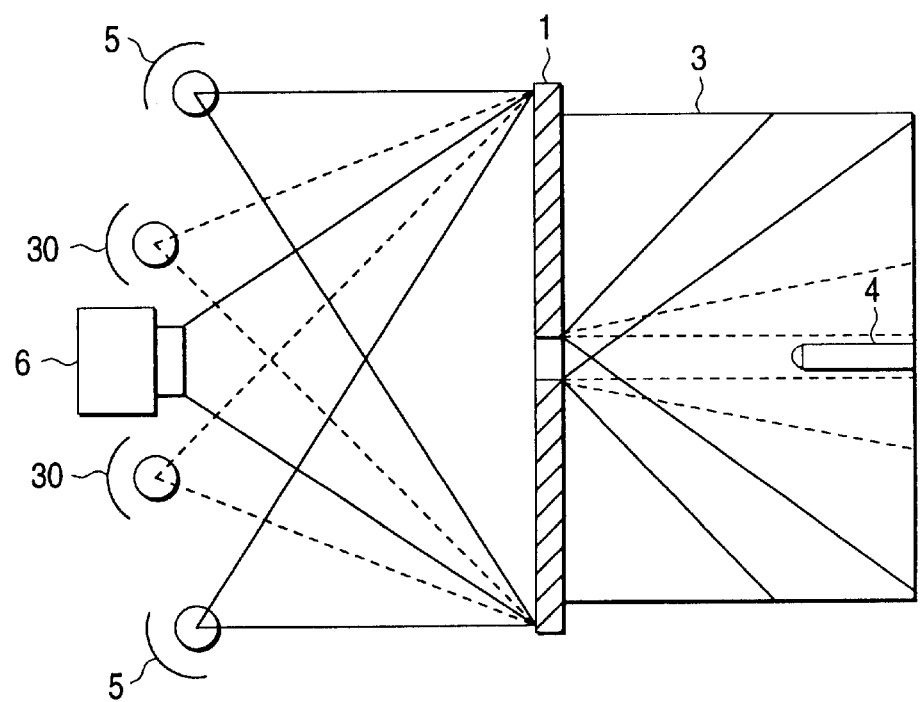
FIG. 12 is a drawing to show another configuration example of the color characteristic measurement apparatus of the seventh embodiment of the invention.

FIG. 12 is a drawing to show another configuration example of the color characteristic measurement apparatus of the seventh embodiment of the invention. The color characteristic measurement apparatus is provided by adding one or more additional illumination light sources 30 to the apparatus shown in FIG. 2.

The illumination light sources 5 are placed at positions where applied light is not applied to the light output section 4 as in FIG. 2, whereas the illumination light sources 30 are placed at positions where applied light is applied to the light output section 4, and applied light from the illumination light sources 30 is reflected on the light output section 4 and becomes an offset. Thus, the illumination intensity of a test chart is controlled by means of the illumination light sources 5 and the offset can be controlled by means of the illumination light sources 30.

FIGS. 15 to 18 are drawings to show other configuration examples of the color characteristic measurement apparatus of the seventh embodiment of the invention.

Figure 15:
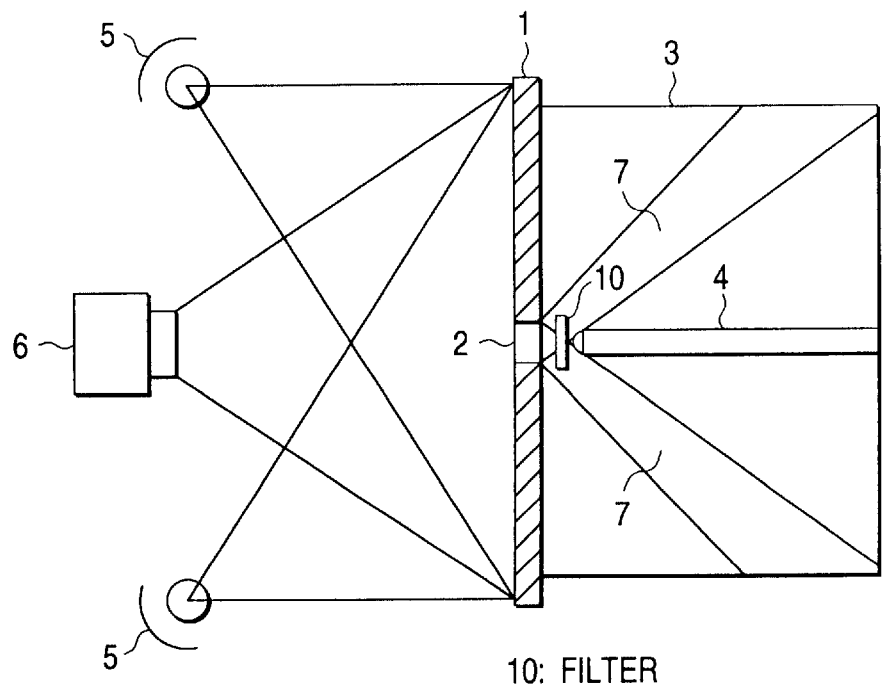
FIGS. 15 and 16 are drawings to show configuration examples of the color characteristic measurement apparatus of the seventh embodiment of the invention, applied to the apparatus comprising a spectral filter in front of a light output section shown in FIG. 6.
Figure 16:
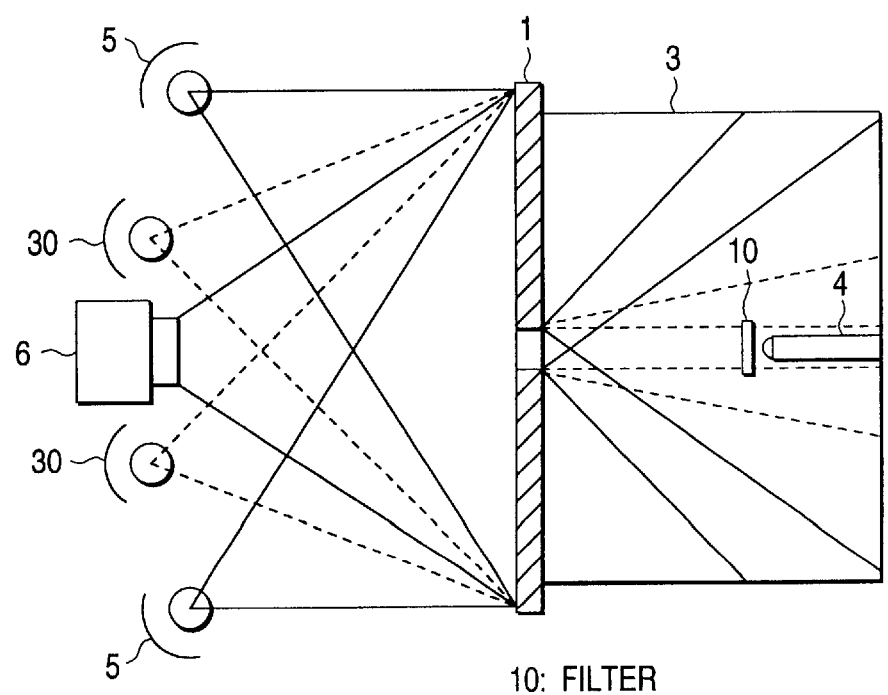

The configuration examples of the color characteristic measurement apparatus shown in FIGS. 15 and 16 are applied to the apparatus comprising the spectral filter 10 in front of the light output section 4 previously described with reference to FIG. 6. The color characteristic measurement apparatus shown in FIG. 15 comprises the illumination light sources 5 for illuminating the spectral filter 10 and the apparatus shown in FIG. 16 comprises the illumination light sources 30 for illuminating the spectral filter 10 rather than the illumination light sources 5. Thus, the color characteristic measurement apparatus comprising the spectral filter can also measure output light to which an offset is added.

Figure 17:
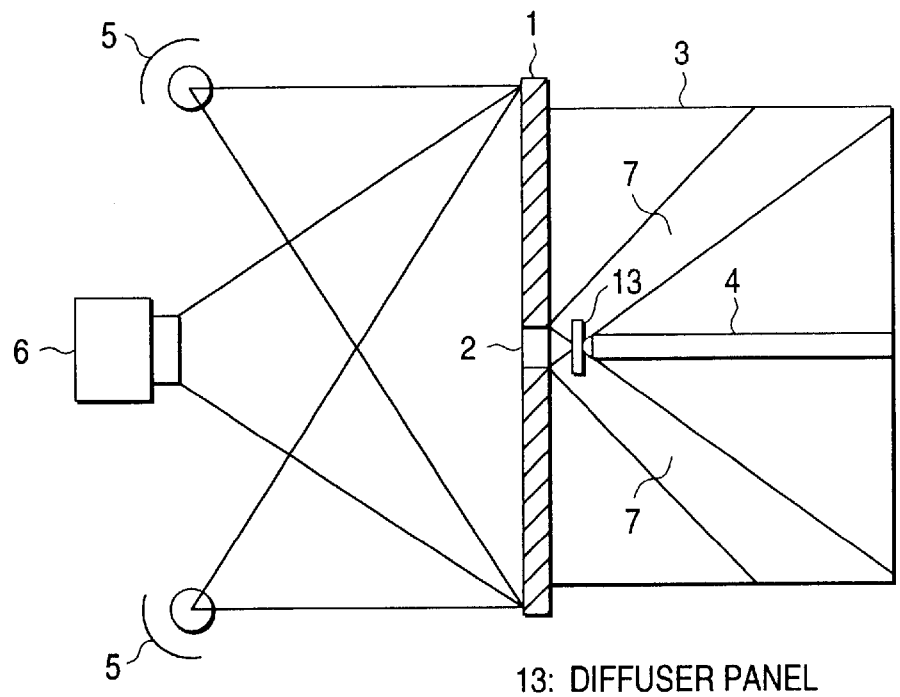
FIGS. 17 and 18 are drawings to show configuration examples of the color characteristic measurement apparatus of the seventh embodiment of the invention, applied to the apparatus comprising a diffuser panel in front of a light output section shown in FIG. 8.
Figure 18:
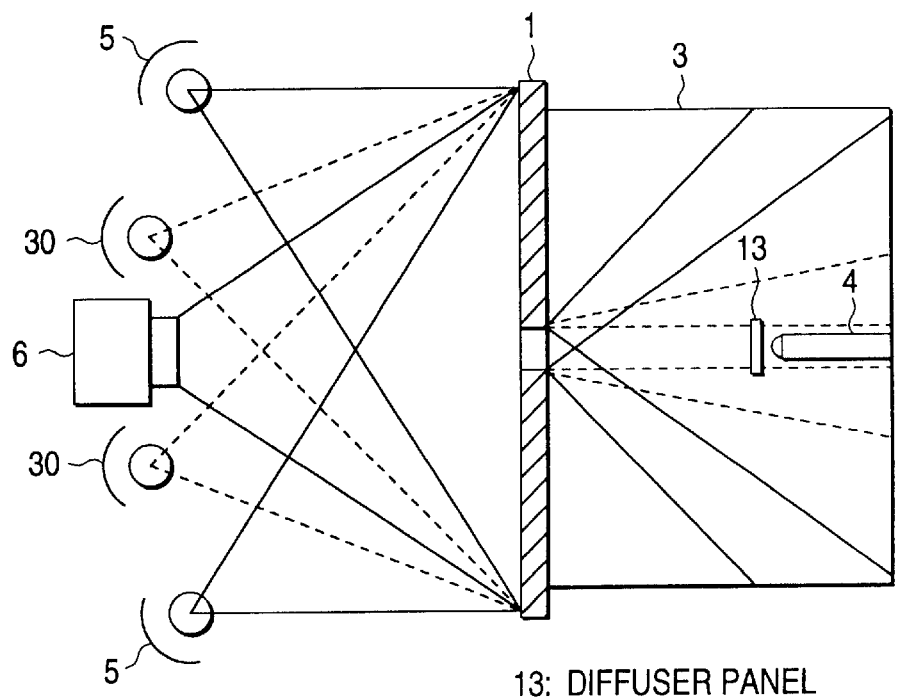

The configuration examples of the color characteristic measurement apparatus shown in FIGS. 17 and 18 are applied to the apparatus comprising the diffuser panel 13 in front of the light output section 4 previously described with reference to FIG. 8. The color characteristic measurement apparatus shown in FIG. 17 comprises the illumination light sources 5 for illuminating the diffuser panel 13 and the apparatus shown in FIG. 18 comprises the illumination light sources 30 for illuminating the diffuser panel 13 rather than the illumination light sources 5. Thus, the color characteristic measurement apparatus comprising the diffuser panel can also measure output light to which an offset is added.

Eighth Embodiment

As an eighth embodiment of the invention, a color characteristic measurement apparatus using a gray scale for correcting a gradation characteristic will be discussed.

Figure 19:
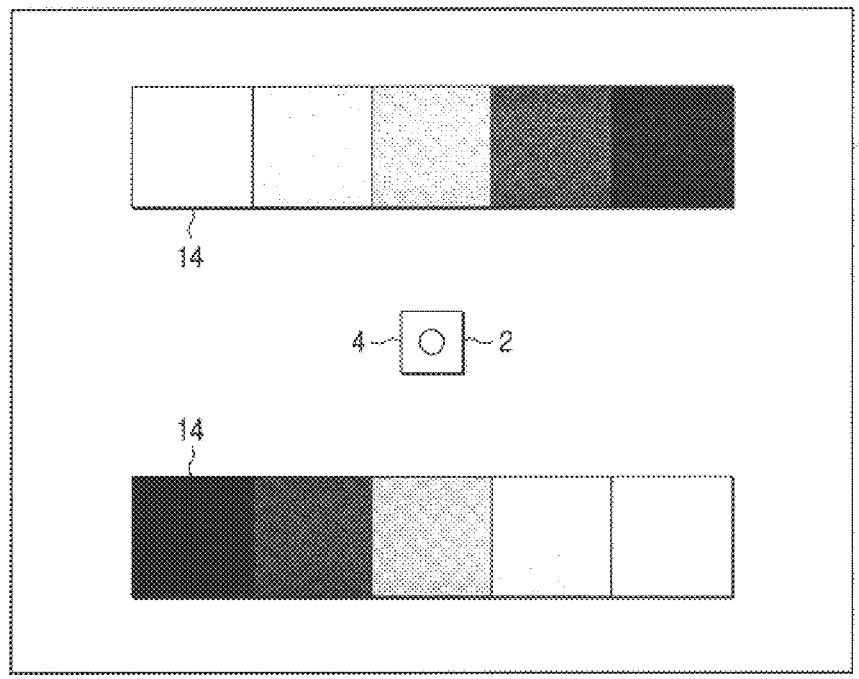
FIG. 19 is a drawing to show an example of the main part of a color characteristic measurement apparatus of an eighth embodiment of the invention, wherein gray scales are placed on a test chart.

FIG. 19 is a drawing to show an example of the main part of the color characteristic measurement apparatus of the eighth embodiment of the invention; it provides a front view of a test chart 1. In FIG. 19, gray scales 14 each comprising an arrangement of color charts different in reflectivity are placed on the test chart 1.

As previously described in the first embodiment, most image pickup machines have automatic correction functions, which include functions of automatically controlling the incident light quantity, the storage time, a gamma correction characteristic, setup level, knee-point, etc., affecting the gradation characteristic of the image pickup machine 6.

Then, the gray scales 14 are placed on the test chart 1 and a hole 2 and the gray scales 14 are imaged by the image pickup machine 6 at the same time, whereby if any change occurs in the automatic correction functions of the image pickup machine 6, the effects of the gradation characteristic correction functions of the image pickup machine 6 can be canceled out on the data in the area of the hole 2 in the picked up image data.

That is, when the characteristic of output light from a light output section 4 is changed in various manners and is observed with the image pickup machine 6, the hole 2 and the gray scales 14 are imaged by the image pickup machine 6 at the same time, whereby the characteristics of the automatic correction functions concerning the gradation characteristic that the image pickup machine 6 has at each observation time are found from the data corresponding to the color charts different in reflectivity in the gray scales 14.

Thus, correction processing can be easily performed for canceling out the effects of the gradation characteristic correction functions of the image pickup machine 6 on the data in the area of the light output section 4 in the picked up image data; precise measurement can be made with the automatic correction function effects excluded.

If the gray scales 14 each consisting of a larger number of color charts different in reflectivity are placed on the test chart 1, more precise characteristics of the automatic correction functions can be provided. However, if one color chart is placed, the characteristics of the automatic correction functions concerning the gradation characteristic can be provided.

Ninth Embodiment

As a ninth embodiment of the invention, a color characteristic measurement apparatus using color charts for correcting a color characteristic will be discussed.

Figure 20:
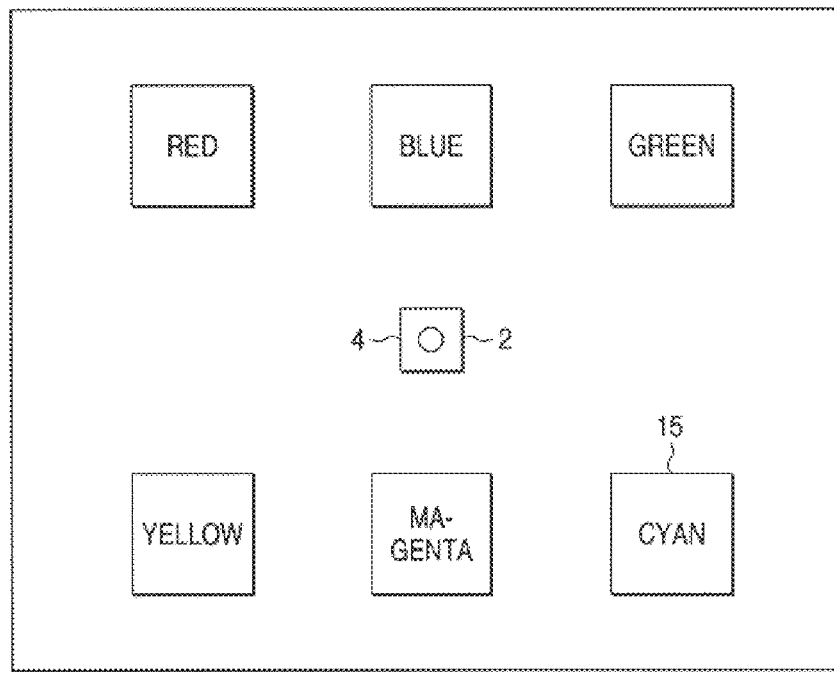
FIG. 20 is a drawing to show an example of the main part of a color characteristic measurement apparatus of a ninth embodiment of the invention, wherein color charts are placed on a test chart.

FIG. 20 is a drawing to show an example of the main part of the color characteristic measurement apparatus of the ninth embodiment of the invention; it provides a front view of a test chart 1. In FIG. 20, color charts 15 different in chromaticity are placed on the test chart 1.

Most image pickup machines have automatic correction functions as previously described in the first embodiment and may comprise automatic correction functions concerning a color characteristic such as black balance correction, white balance correction, and color matrix correction.

Then, the color charts 15 are placed on the test chart 1 and a hole 2 and the color charts 15 are imaged by the image pickup machine 6 at the same time, whereby if any change occurs in the automatic correction functions of the image pickup machine 6, the effects of the color characteristic correction functions of the image pickup machine 6 can be canceled out on the data in the area of the hole 2 in the picked up image data.

That is, when the characteristic of output light from a light output section 4 is changed in various manners and is observed with the image pickup machine 6, the hole 2 and the color charts 15 are imaged by the image pickup machine 6 at the same time, whereby the characteristics of the automatic correction functions concerning the color characteristic that the image pickup machine 6 has at each observation time are found from the data corresponding to the color charts 15 different in chromaticity.

Thus, correction processing can be easily performed for canceling out the effects of the color characteristic correction functions of the image pickup machine 6 on the data in the area of the light output section 4 in the picked up image data; precise measurement can be made with the automatic correction function effects excluded.

If a larger number of the color charts 15 different in chromaticity are placed on the test chart 1, more precise characteristics of the automatic correction functions can be provided. However, if one color chart is placed, the characteristics of the automatic correction functions concerning the color characteristic can be provided.

Tenth Embodiment

As a tenth embodiment of the invention, a color characteristic measurement apparatus for precisely measuring the gradation characteristic in a low-brightness area will be discussed.

Figure 21:
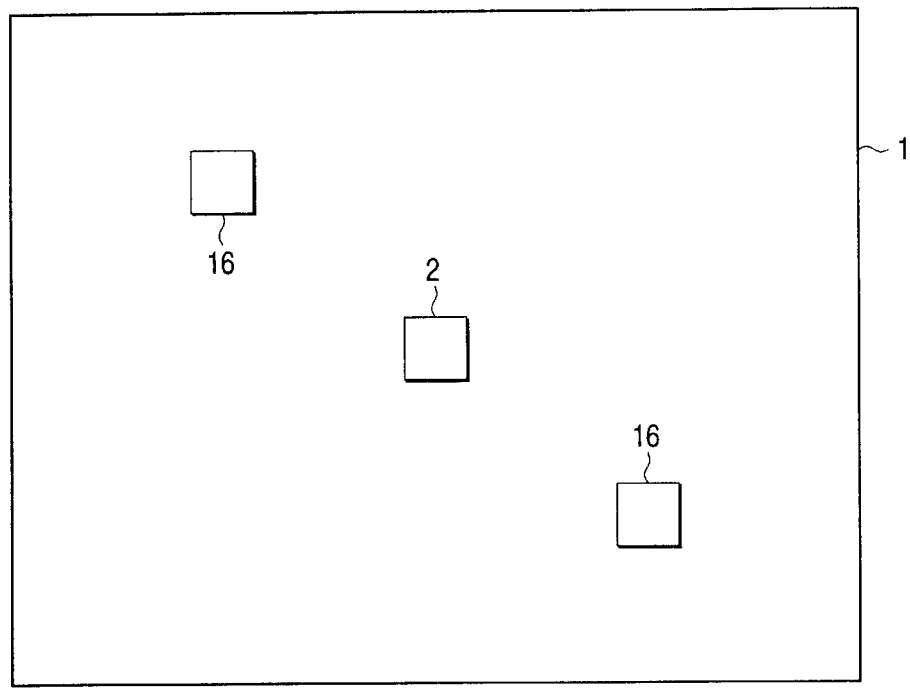
FIG. 21 is a drawing to show an example of the main part of a color characteristic measurement apparatus of a tenth embodiment of the invention.

FIG. 21 is a drawing to show an example of the main part of the color characteristic measurement apparatus of the tenth embodiment of the invention; it provides a front view of a test chart 1. In FIG. 21, in addition to a hole 2, two holes 16 are made in the test chart 1. These holes 16 are of sizes and are made at positions such that output light from a light output section 4 is not observed on an image pickup machine 6 through the holes 16 and that light from an illumination light source 5 is not applied to the light output section 4 through the holes 16.

The holes 16 are made, whereby an optically almost complete black portion in a black box 3, namely, black with reflectivity close to 0% can be observed through the holes 16, so that zero-level correction on the test chart 1 and the light source 4 can be made. The hole 16 is provided as a black color chart of the gray scale previously described in the eighth embodiment, whereby a precise gradation characteristic can be provided particularly concerning a low-brightness area.

Eleventh Embodiment

As an eleventh embodiment of the invention, a color characteristic measurement apparatus for precisely measuring the gradation characteristic in a high-brightness area will be discussed.

Figure 22:
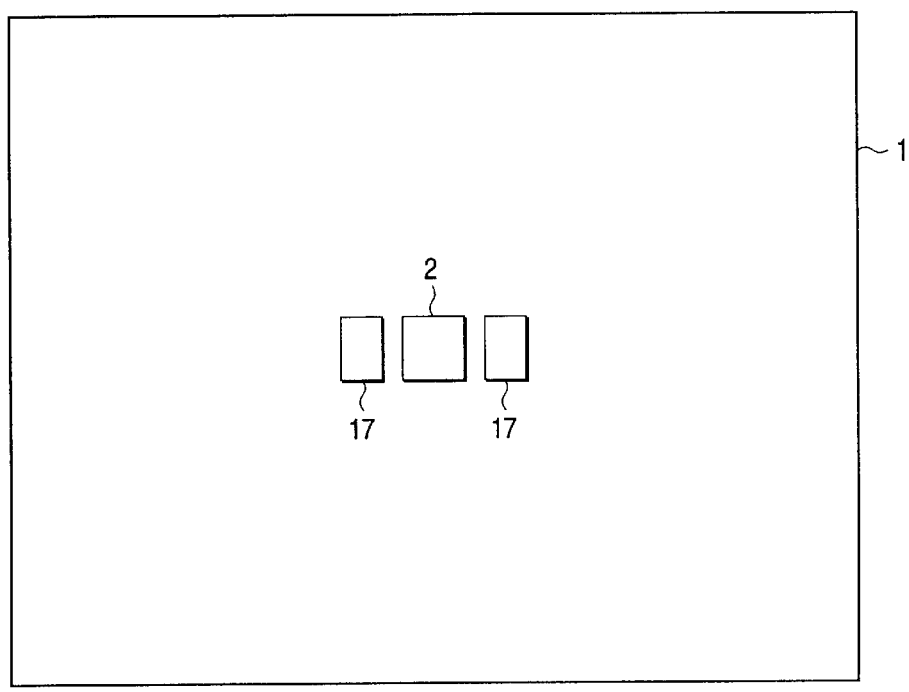
FIG. 22 is a drawing to show an example of the main part of a color characteristic measurement apparatus of an eleventh embodiment of the invention.

FIG. 22 is a drawing to show an example of the main part of the color characteristic measurement apparatus of the eleventh embodiment of the invention; it provides a front view of a test chart 1. In FIG. 22, reference white color charts 17 are placed on the test chart 1 in the proximity of a hole 2 made therein.

When the test chart 1 is imaged by an image pickup machine 6 and a light output section 4 is changed in various manners, if the reflectivities of other color charts of the test chart 1 and a background are set so that the image data corresponding to the reference white color charts 17 becomes almost the maximum in the dynamic range of the image pickup machine 6 and if output light of the light output section 4 is changed so that the image data in the area of the light output section 4 observed through the hole 2 becomes the maximum in a range not exceeding the image data in the reference white areas, it is made possible to execute high-resolution measurement making the effective use of the dynamic range of the image pickup machine 6 in which image data is not saturated with respect to high-brightness input.

If the image pickup machine 6 has channels for a number of colors, output light of the light output section 4 may be changed so that image data is not saturated with respect to any channels.

To set the image pickup machine 6 of the type wherein the automatic correction function state cannot be set from the outside so that the image data in the reference white areas becomes almost the maximum in the dynamic range of the image pickup machine 6, a method of placing a white or black flat plate in the surroundings of the test chart 1 and changing the image pickup view angle of the image pickup machine 6 or the like is available; placement of the reference white color charts 17 in the proximity of the hole 2 is also effective for the method.

As another effect of placing the reference white color charts 17 in the proximity of the hole 2 in the test chart 1, when various characteristics based on the light source 4 observed through the hole 2 are measured, change in the image data in the reference white areas in the proximity of the hole 2 can be observed at the same time, so that it is made possible to detect delicate change in the gradation characteristic particularly in a high-brightness area and correct the above-mentioned various characteristics in response to the change.

Twelfth Embodiment

As a twelfth embodiment of the invention, a color characteristic measurement method of an image pickup machine using the above-described color characteristic measurement apparatus will be discussed.

First, to image a test chart 1 by the image pickup machine 6, light is applied to the test chart 1 from the illumination light sources 5. At this time, light is also applied to the inside of the black box 3 through the hole 2 from the illumination light sources 5. The application range of the applied light 7 is determined by the size of the hole 2 and the positions of the illumination light sources 5. Then, the illumination light sources 5 and the test chart 1 are placed as shown in FIG. 1 so as not to apply light to the light output section 4 observed through the hole 2 directly from the illumination light sources 5, and the test chart 1 containing output light of the light output section 4 oberved through the hole 2 is imaged by the image pickup machine 6.

If the image pickup machine 6 is, for example, a digital still camera, data corresponding to the area of the light output section 4 can be provided from the image data output after an image is picked up. This is first data. Color characteristic measurement of the image pickup machine 6 can be executed by observing the first data.

The image pickup machine 6 is connected to, for example, a personal computer, etc., and application software, etc., is used to input image data from the image pickup machine 6 to the personal computer, then the data corresponding to the light output section 4 can also be provided from the input image data. This is second data.

Generally, the image data input to the personal computer is provided by performing gradation characteristic conversion operation, color space conversion operation, operation for making good color considering the visual characteristics of human beings, or the like on the first data. Thus, color characteristic measurement of the image pickup machine 6 containing the application software can be executed by observing the second data.

The manufacturers or dealers of the image pickup machines 6 often manufacture and sell the image pickup machine 6 and application software in combination, in which case color characteristic measurement of the image pickup machine 6 can be executed based on the first data and in addition, comprehensive color characteristic measurement of the image pickup machine 6 containing the characteristics of the application software, etc., can also be executed based on the second data.

The application software may be called any other representation such as driver software. If application software, etc., for inputting image data from the image pickup machine 6 to any other machine or system and application software, etc., for performing various conversion operations on the input image data to prepare the second data are separate software products rather than one piece, a similar advantage is also provided, of course.

Thirteenth Embodiment

As a thirteenth embodiment of the invention, a color characteristic measurement method using the color characteristic measurement apparatus previously described with reference to FIG. 20 with the color charts 15 placed on the test chart 1 as a subject of an image pickup image 6 will be discussed. The first or second data provided by the method of the twelfth embodiment described above is corrected from color change in the portions of the color charts 15 in the image data picked up by the image pickup machine 6.

According to the method of the thirteenth embodiment, if the color characteristic is changed due to the effects of automatic correction functions, etc., it can be corrected to provide the first or second data.

Fourteenth Embodiment

As a fourteenth embodiment of the invention, a color characteristic measurement method using the above-described color characteristic measurement apparatus for measuring the precise graduation characteristic of an image pickup machine 6 will be discussed.

If the above-described color characteristic measurement apparatus is used, the automatic correction functions of the image pickup machine 6 work only for the test chart 1 and are not affected by change in output light of the light output section 4. However, the automatic functions of the image pickup machine 6, for example, the automatic exposure control function may work because of change in the illumination intensity of the illumination light source 5 illuminating the test chart 1. If the image pickup machine 6 is a digital camera, etc., often the exposure control operation is repeated within a short time each time an image is picked up, thus the iris, electronic shutter speed, signal processing gain, and the like are not necessarily the same whenever an image is picked up.

Change in the illumination intensity of the illumination light source 5 can be suppressed by using a stabilized power supply for supply power to the illumination light source 5. Change of the automatic functions of the image pickup machine 6 is minute because the subject is the same except for output light through the hole 2. However, to measure the precise gradation characteristic of the image pickup machine 6, the effect of the minute change needs also to be corrected.

As an example, a case will be examined where the light quantity of output light of the light output section 4 is changed continuously or gradually from 0% to 100% of the maximum light quantity. The light output section 4 does not output light and light entered through the hole 2 is not output either through the hole 2 to the outside, whereby the light quantity of 0% can be realized.

Figure 23:
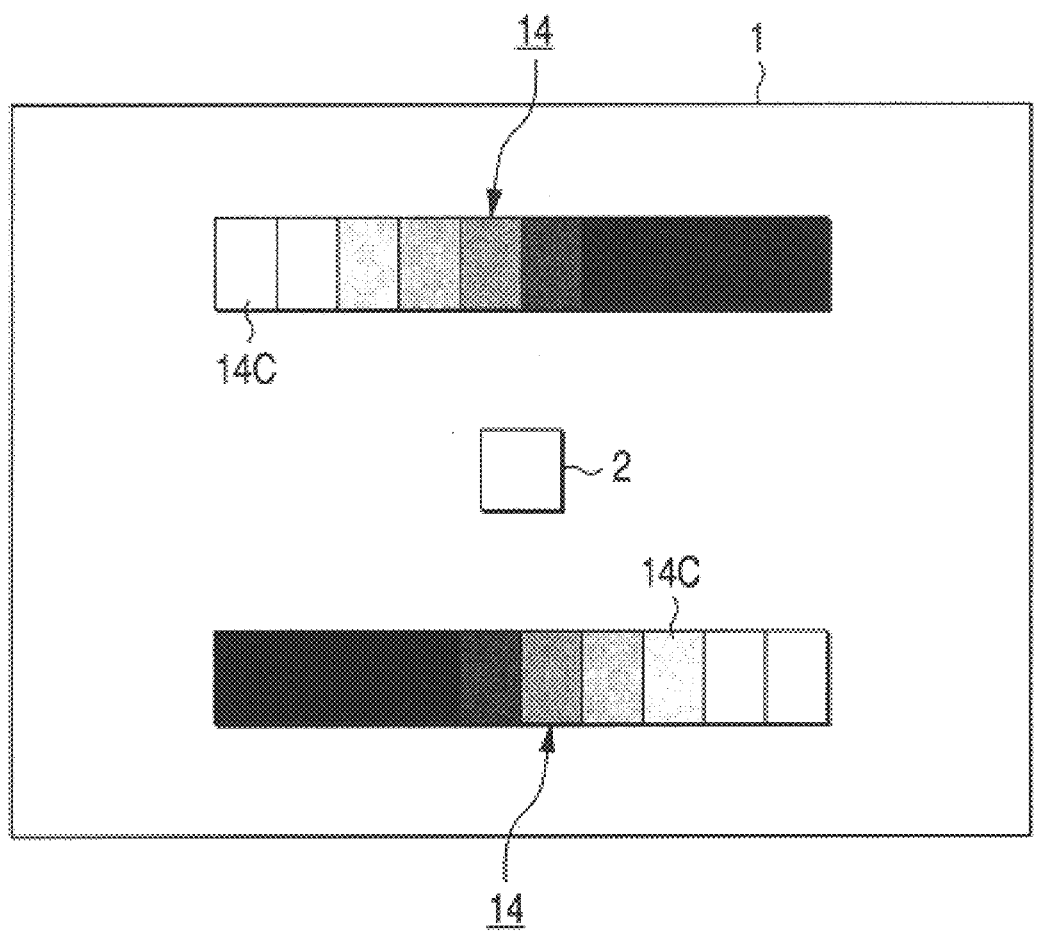
FIG. 23 is a drawing to show an example of a test chart of a color characteristic measurement apparatus of a fourteenth embodiment of the invention.

Then, the output light quantity of the light output section 4 is adjusted in the range of 0% to 100% and the test chart 1 is imaged by the image pickup machine 6 in each adjusted light quantity. At this time, as shown in FIG. 23, the test chart 1 is provided with gray scales 14 each consisting of color charts 14C different in reflectivity and the image pickup machine 6 also images the color charts 14C at the same time as output light from the light output section 4.

When the automatic functions of the image pickup machine 6 do not change, if the output light quantity of the light output section 4 is changed gradually and an image is picked up each time, the image data values of the gray scales 14 become the same in every image. However, if the image data values of the gray scales 14 change for some factor, the image data values of the light output section 4, namely, the hole 2 for measuring the gradation characteristic of the image pickup machine 6 also change likewise, thus the precise gradation characteristic cannot be provided.

Then, a chart applied when the output light quantity of the light output section 4 is adjusted to a specific light quantity (for example, 50% of the maximum light quantity) is adopted as a reference chart and the image data values of the gray scale 14 provided when the output light quantity is changed are compared with those of the gray scale 14 of the reference chart. If they differ, the image data value of the light output section 4 is corrected linearly as much as the image data value difference between the gray scales 14.

Let the image data values of the color charts 14C imaged with output light of the light output section 4 set to one light quantity be Y0, Y1, ..., Y14 and Y15 and the image data value of the light output section 4 at the time be Xi. Assume that the relation between the image data values Y0 to Y15 of the color charts 14C and the image data value Xi satisfies the following expression (1):

$$Y0, Y1, \ldots < Yi < Xi < Yi+1 \ldots, Y14, Y15 \tag{1}$$

Let the image data values of the color charts 14C on the reference chart be Ystd0, Ystd1, ..., Ystd14, and Ystd15.

At this time, if the image data value Yi or Yi+1 of the color chart differs from the image data value Ystdi or Ystdi+1 of the corresponding color chart 14C on the reference chart (Yi≠Ystdi or Yi+1≠Ystdi+1), the image data value Xi is corrected according to the following expression, namely, post-corrected image data value X'i is found according to the following expression (2):

$$X'i=(Xi-Yi)(Ystdi+1-Ystdi)/(Yi+1-Yi)+Ystdi \tag{2}$$

Figure 24:
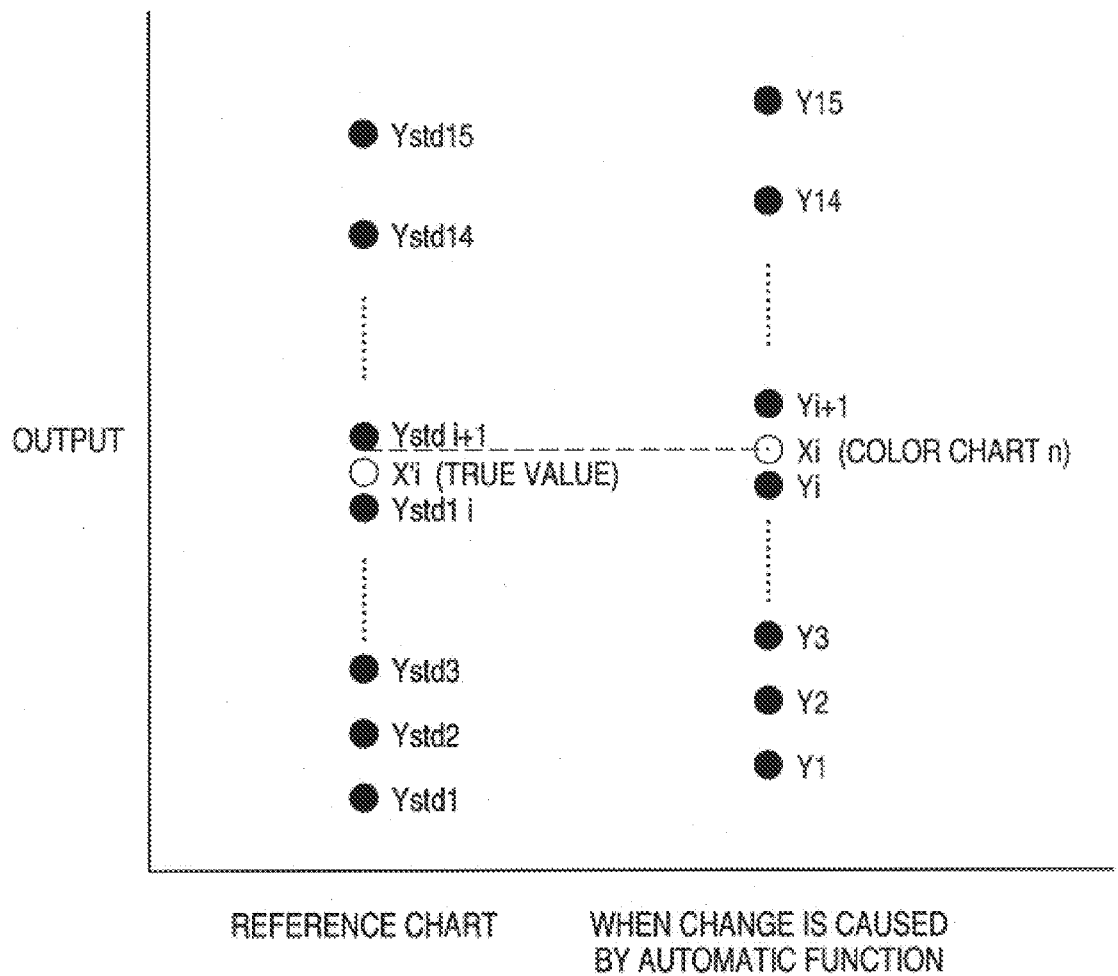
FIG. 24 is a drawing to show the relationships among image data values output by an image pickup machine.

The correction shown in expression (2) will be discussed with reference to FIG. 24, which is a drawing to show the relationships among the image data values. The image data values Yi, Xi, and Yi+1 provided when the light quantity is changed and the image data values Ystdi+1 and Ystdi of the reference chart are shown. In the image data of the reference chart, the true value of the image data Xi should be at the position of X'i shown in FIG. 24. Therefore, the true value of the image data Xi can be calculated according to the above-mentioned expression (2).

When output data of the image pickup machine 6 is R, G, and B, if the image data values of the color charts 14C change from those of the reference chart, a similar correction is made to R, G, and B data, whereby the true values of the image data in each image can be provided and the precise gradation characteristic of the image pickup machine 6 can be measured.

If the correction is made to the first data provided by the method of the twelfth embodiment, the gradation characteristic of the image pickup machine 6 can be found; if the correction is made to the second data, the comprehensive gradation characteristic of the image pickup machine 6 also containing application software can be found.

Fifteenth Embodiment

As a fifteenth embodiment of the invention, a color characteristic measurement method using the above-described color characteristic measurement apparatus for imaging a color chart inserted into the hole 2 in the test chart 1 by an image pickup machine 6 and measuring the precise gradation characteristic of the image pickup machine 6 will be discussed.

As in the fourteenth embodiment, the automatic correction functions of the image pickup machine 6 work only for the test chart 1 and are not affected by change in the color chart inserted into the hole 2, but may work because of the effect of disturbance or each time an image is picked up. Thus, to measure the precise gradation characteristic of the image pickup machine 6, the effects need to be corrected.

As an example, the reflectivities of color charts 2C are set to 0.0%, 2.0%, 4.0%, 6.0%, 8.0%, 10.3%, 14.7%, 19.8%, 25.8%, 32.5%, 39.9%, 48.1%, 57.0%, 66.6.%, 77.0%, and 88.1%. If it is difficult to prepare the color chart 2C of reflectivity 0.0%, no color chart is inserted into the hole 2 in the test chart 1 in a state in which light is not emitted from the light output section 4 and light entered through the hole 2 is not output again through the hole 2 to the outside, whereby the color chart 2C of reflectivity 0% can be realized.

Figure 25:
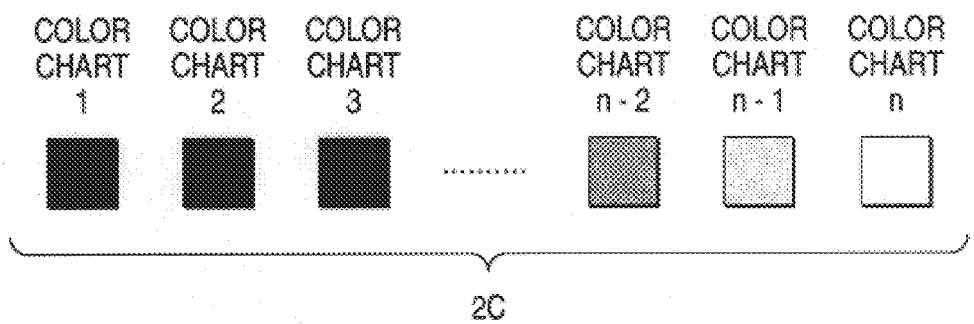
FIG. 25 is a drawing to show examples of color charts inserted into a hole in a color characteristic measurement apparatus of a fifteenth embodiment of the invention.

The test chart 1 used is similar to that in FIG. 23. The color charts 2C different in reflectivity are placed in the hole 2 one at a time in order and an image is picked up by the image pickup machine 6. FIG. 25 shows the color charts 2C different in reflectivity each inserted into the hole 2 in the test chart 1.

Figures 26, 27:
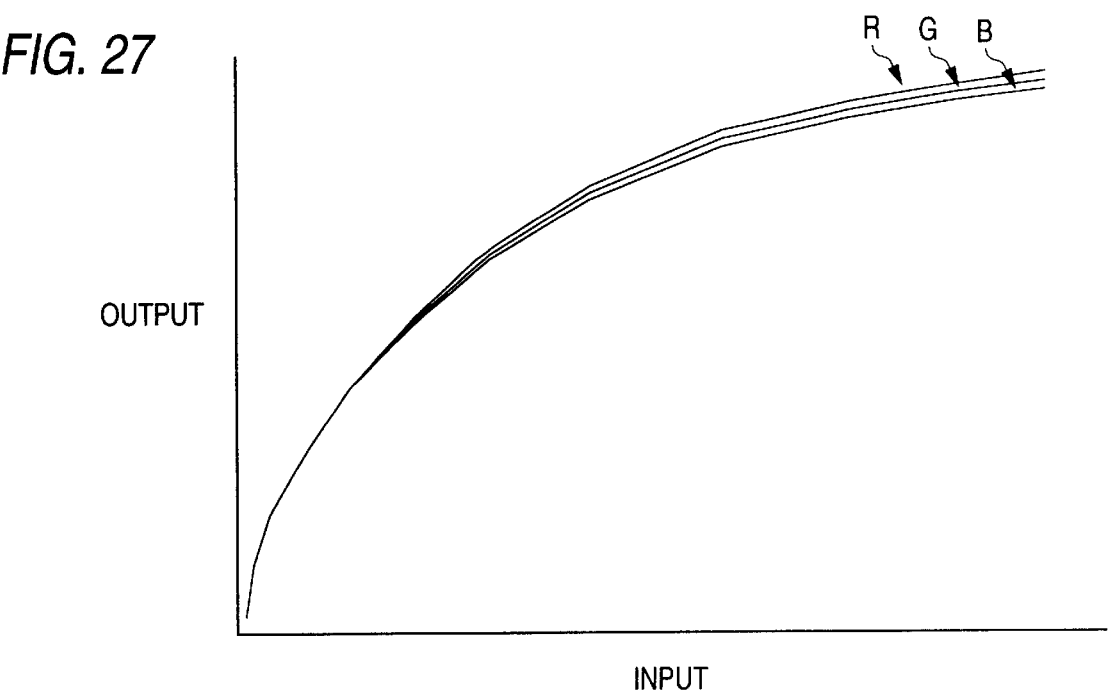
FIG. 26 is a drawing to show examples of image data output by an image pickup machine.
FIG. 27 is a drawing to show an example of the found gradation characteristic of the image pickup machine.

The color charts 2C are inserted into the hole 2 in the test chart 1 one at a time in order and the test chart 1 is imaged by the image pickup machine 6 under the photograph taking conditions shown in FIG. 2. The pixel values of the color charts 2C in the picked up images are found, whereby the gradation characteristic of the image pickup machine 6 can be measured. For example, when output data of the image pickup machine 6 is R, G, and B and output data of the color charts 2C different in reflectivity is provided as shown in FIG. 26, the gradation characteristic of the image pickup machine 6 of the test specimen can be represented as shown in FIG. 27.

Figure 28:
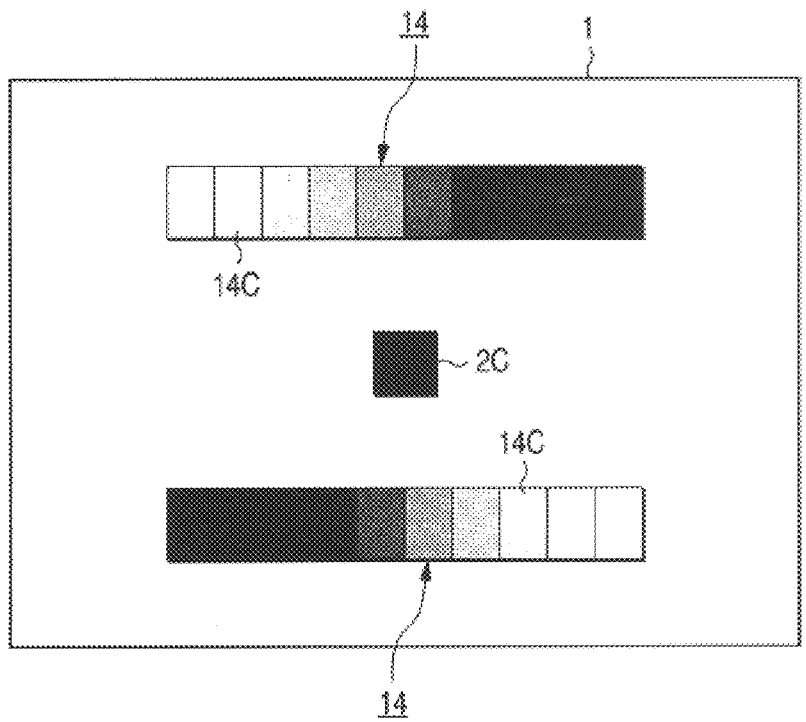
FIG. 28 is a drawing to show an example of a picked up image with a color chart inserted into the test chart.
Figure 29:
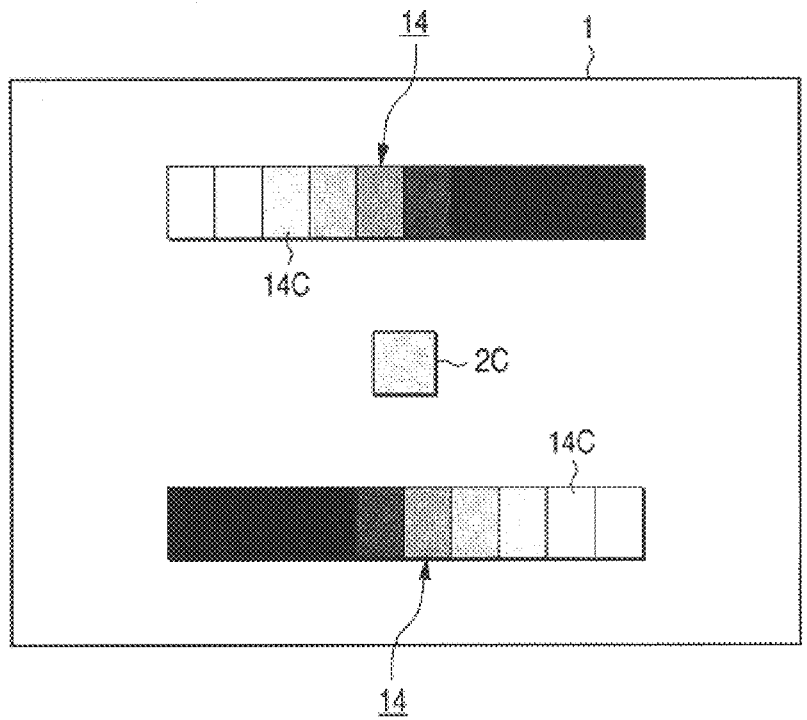

FIG. 28 shows an image picked up by the image pickup machine 6 with the color chart 2C of reflectivity 25.8% inserted into the test chart 1. FIG. 29 shows an image picked up by the image pickup machine 6 with the color chart 2C of reflectivity 77.0% inserted into the test chart 1. To measure the gradation characteristic of the image pickup machine 6, as many images as the number of the color charts 2C different in reflectivity are picked up as images shown in FIGS. 28 and 29.

Now, assume that the image shown in FIG. 28 is adopted as a reference chart. Gray scales 14 in FIG. 28 are each provided with color charts 14C different in reflectivity. The color charts 14C on the gray scales 14 may or may not be of the same reflectivities as the color charts 2C shown in FIG. 25.

When the automatic functions of the image pickup machine 6 do not change, if the color charts 2C different in reflectivity are inserted into the hole 2 in the test chart 1 one at a time in order and an image is picked up by the image pickup machine 6, the image data values of the gray scales 14 become the same in every image. However, if the image data values of the color charts of the gray scales 14 change for some factor, the image data values of the color charts 2C for measuring the gradation characteristic of the image pickup machine 6 also change likewise, thus the precise gradation characteristic cannot be provided.

If the provided image data values of the color charts of the gray scales 14 differ from the image data values of the gray scales 14 of the reference chart, the image data value of the color chart 2C is corrected linearly as much as the image data value difference.

Let the image data values of the color charts 14C of the gray scales 14 imaged with the color chart 2C of one reflectivity inserted into the hole 2 in the test chart 1 as shown in FIG. 29 be Y0, Y1, . . . , Y14 and Y15 and the image data value of the color chart 2C at the time be Xi. Assume that the relation between the image data value of the color chart 2C and the image data values of the color charts 14C of the gray scales 14 in FIG. 29 satisifes the following expression (3):

$$Y0, Y1, \ldots < Yi < Xi < Yi+1 \ldots, Y14, Y15 \qquad (3)$$

Let the image data values of the color charts 14C on the reference chart shown in FIG. 28 be Ystd0, Ystd1, . . . , Ystd14, and Ystd15.

When the image data value Yi or Yi+1 of the color chart 14C differs from the image data value Ystdi or Ystdi+1 of the corresponding color chart 14C on the reference chart (Yi≠Ystdi or Yi+1≠Ystdi+1), the image data value Xi is corrected according to the following expression: (Assume that post-corrected image data value is X'i.)

$$X'i = (Xi - Yi)(Ystdi+1 - Ystdi)/(Yi+1 - Yi) + Ystdi \qquad (4)$$

Figure 30:
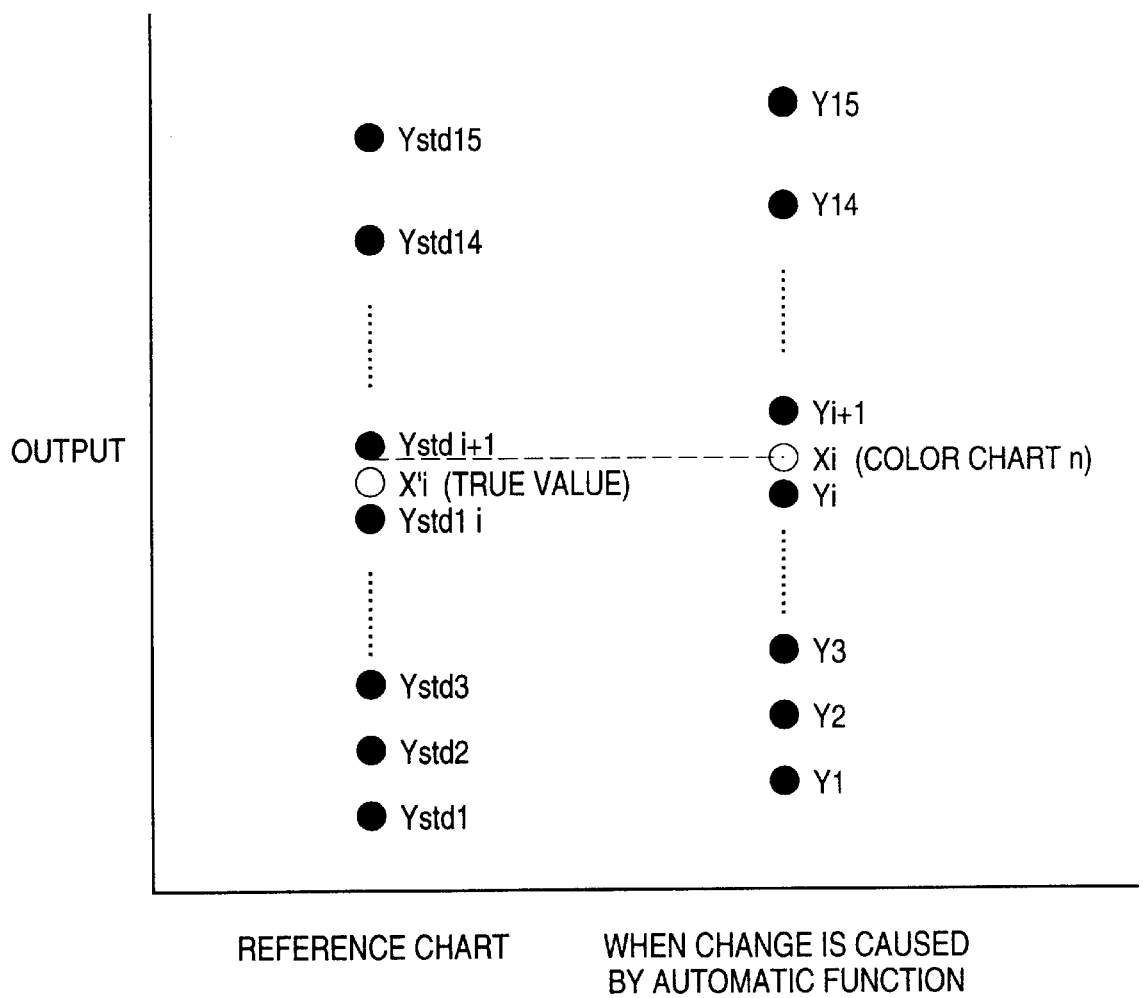
FIG. 30 is a drawing to show the relationships among image data values output by the image pickup machine.

The correction shown in expression (4) will be discussed with reference to FIG. 30, which is a drawing to show the relationships among the image data values. The relationships among the image data values Yi, Xi, and Yi+1 shown in FIG. 28 are as shown in FIG. 30. When the values Ystdi+1 and Ystdi of the reference chart are the values shown in FIG. 30, the true value of the image data Xi should be at the position of X'i shown in FIG. 30. Therefore, the true value of the image data Xi can be calculated according to the above-mentioned expression (4).

When output data of the image pickup machine 6 is R, G, and B, a similar correction is made to each of R data, G data, and B data, whereby the true value of the image data of the color chart 2C in each image can be provided and the precise gradation characteristic of the image pickup machine 6 can be measured.

The embodiment uses the image with the color chart 2C of reflectivity 25.8% inserted in the hole 2 as the reference chart, but if an image with any other color chart 2C inserted in the hole 2 is used as the reference chart, a similar advantage can be provided, needless to say.

If the correction is made to the first data provided by the method of the twelfth embodiment, the gradation characteristic of the image pickup machine 6 can be found; if the correction is made to the second data, the comprehensive gradation characteristic of the image pickup machine 6 also containing application software can be found.

Sixteenth Embodiment

As a sixteenth embodiment of the invention, a color characteristic measurement method using the above-described color characteristic measurement apparatus for measuring the precise spectral sensitivity characteristic of an image pickup machine 6 will be discussed.

If the above-described color characteristic measurement apparatus is used, the automatic correction functions of the image pickup machine 6 work only for the test chart 1 and are not affected by change in the light output section 4, but may work because of the effect of disturbance or each time an image is picked up. To measure the precise spectral sensitivity characteristic of the image pickup machine 6, the effects need to be corrected.

Figures 31, 32:
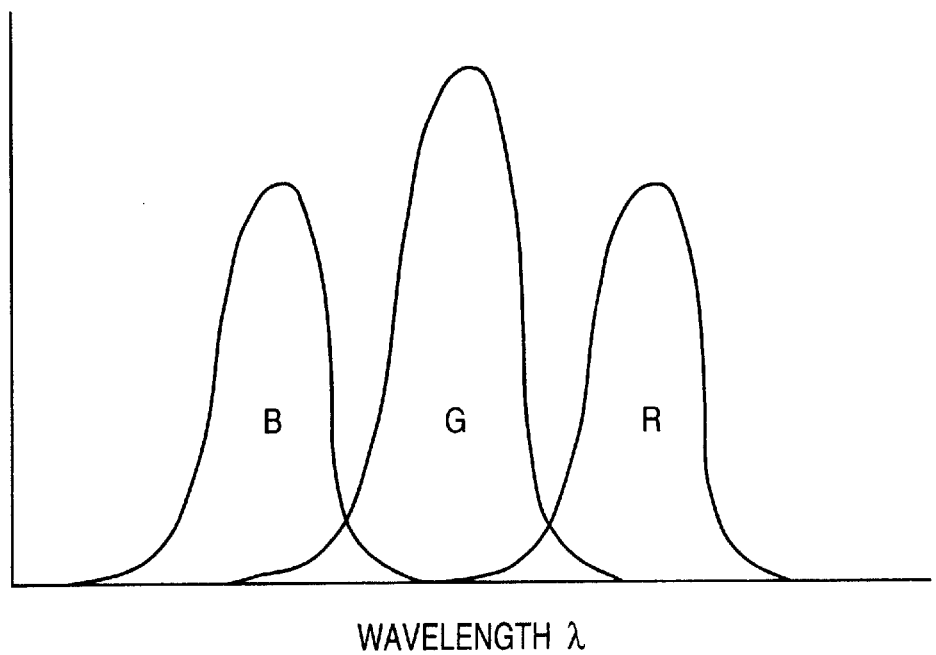
FIG. 31 is a table to list the correspondences between the wavelengths and image data output by an image pickup machine at the wavelengths in a sixteenth embodiment of the invention.
FIG. 32 is a drawing to show the spectral sensitivity characteristic of the image pickup machine.

In the above-described color characteristic measurement apparatus, output light from the light output section 4 is changed in specific wavelength steps in a specific wavelength range and the test chart 1 is imaged by the image pickup machine 6. In the picked up image, the pixel values of the light output section 4 are found for each specific wavelength, whereby the spectral sensitivity characteristic of the image pickup machine 6 can be measured. For example, when output data of the image pickup machine 6 is R, G, and B and output data at the wavelengths is provided as shown in FIG. 31, the spectral sensitivity characteristic of the image pickup machine 6 of the test specimen can be represented as shown in FIG. 32.

Figure 33:
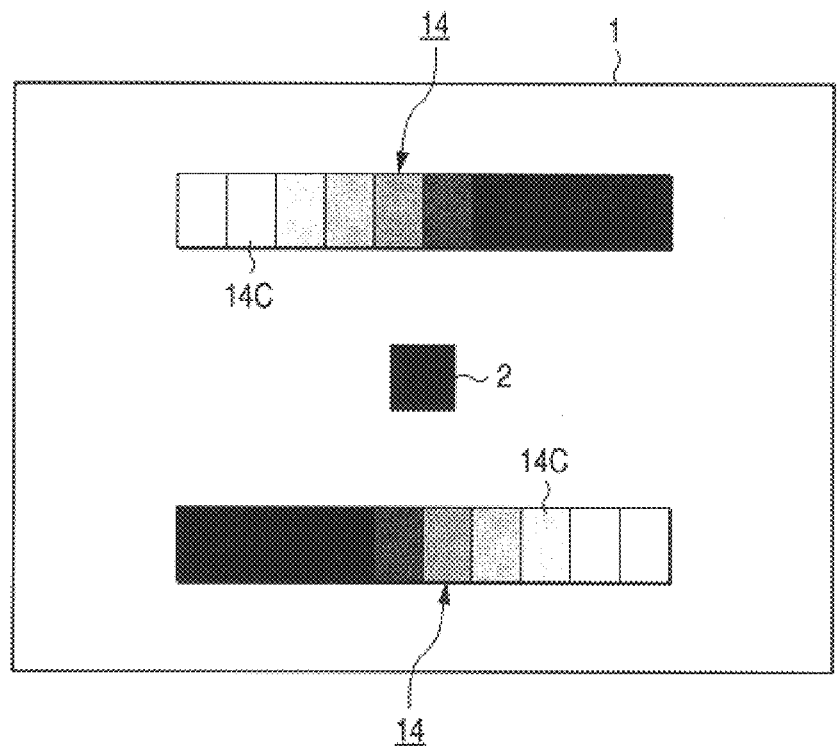
FIG. 33 is a drawing to show an example applied when one single-wavelength light is output from a light output section.
Figure 34:
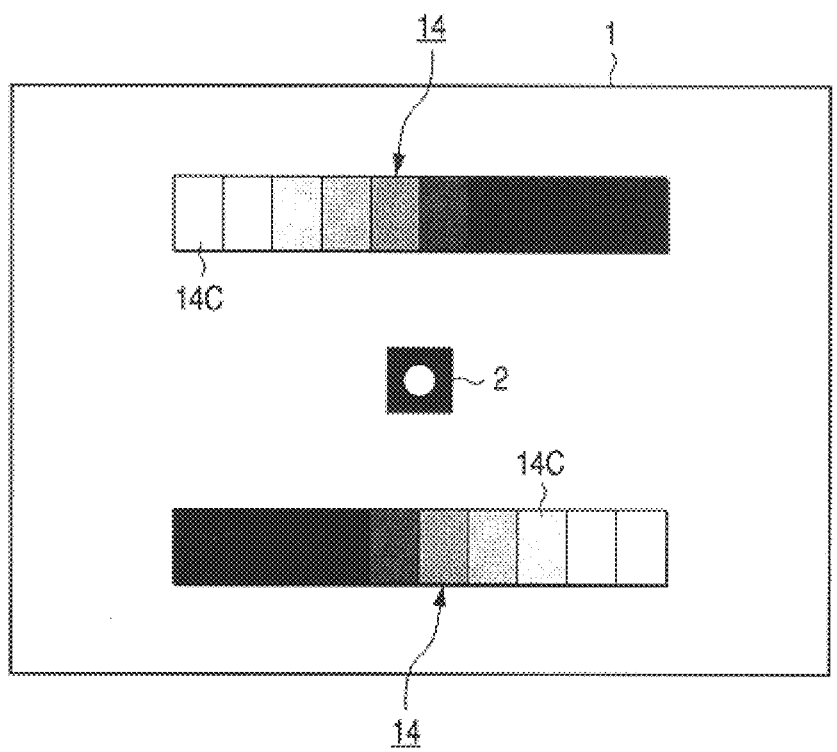
FIG. 34 is a drawing to show another example applied when one single-wavelength light is output from a light output section.

As an example, the wavelengths of output light of the light output section 4 are 380 nm, 385 nm, 390 nm, . . . , 770 nm, 775 nm, and 780 nm. FIG. 33 shows an image picked up by the image pickup machine 6 when single-color light of wavelength 580 nm is emitted. In FIG. 33, an image of the light output section 4 in the hole 2 is picked up. FIG. 34 shows an image picked up when light of wavelength λ nm is emitted. To measure the color characteristic of the image pickup machine 6, as many images as the number of the different wavelengths are picked up as images shown in FIGS. 33 and 34. If an image is thus picked up in 5-nm steps in the range of 380 nm to 780 nm, 81 images are picked up in total.

Now, assume that the image, shown in FIG. 33, picked up when the wavelength of output light through the hole 2 is 580 nm is adopted as a reference chart. Gray scales 14 in FIG. 33 are each provided with color charts 14C different in reflectivity.

When the automatic functions of the image pickup machine 6 do not change, if the wavelength of output light from the light output section 4 is changed and an image is picked up by the image pickup machine 6 each time, the image data values of the color charts 14C of the gray scales 14 are the same in every image. However, if the image data values of the color charts 14C of the gray scales 14 change for some factor, the image data values of the light output section 4 for measuring the spectral sensitivity characteristic of the image pickup machine 6 also change likewise, thus the precise color characteristic cannot be provided.

If the provided image data values of the color charts of the gray scales 14 differ from the image data values of the gray scales 14 of the reference chart, the image data value of the light output section 4 is corrected linearly as much as the image data value difference.

Let the image data values of the color charts 14C of the gray scales 14 of an image picked up when the wavelength of one output light of the light output section 4 is λ be Y0, Y1, . . . , Y14 and Y15, as shown in FIG. 34, and the image data value of the light output section 4 be Xλ. Assume that in FIG. 34, the relation between the image data value of the light output section 4 and the image data values of the color charts 14C of the gray scales 14 satisfies the following expression (5):

$$Y0, Y1, \ldots < Yi < X\lambda < Yi+1 \ldots, Y14, Y15 \qquad (5)$$

Let the image data values of the color charts 14C of the gray scales 14 on the reference chart be Ystd0, Ystd1, . . . , Ystd14, and Ystd15, as shown in FIG. 33.

At this time, if the image data value Yi or Yi+1 of the color chart differs from the image data value Ystdi or Ystdi+1 of the corresponding color chart on the reference chart (Yi≠Ystdi or Yi+1≠Ystdi+1), the image data value Xλ is corrected according to the following expression (6): (Assume that post-corrected image data value is X'λ.)

$$X'\lambda=(X\lambda-Yi)(Ystdi+1-Ystdi)/(Yi+1-Yi)+Ystdi \quad (6)$$

Figure 35:
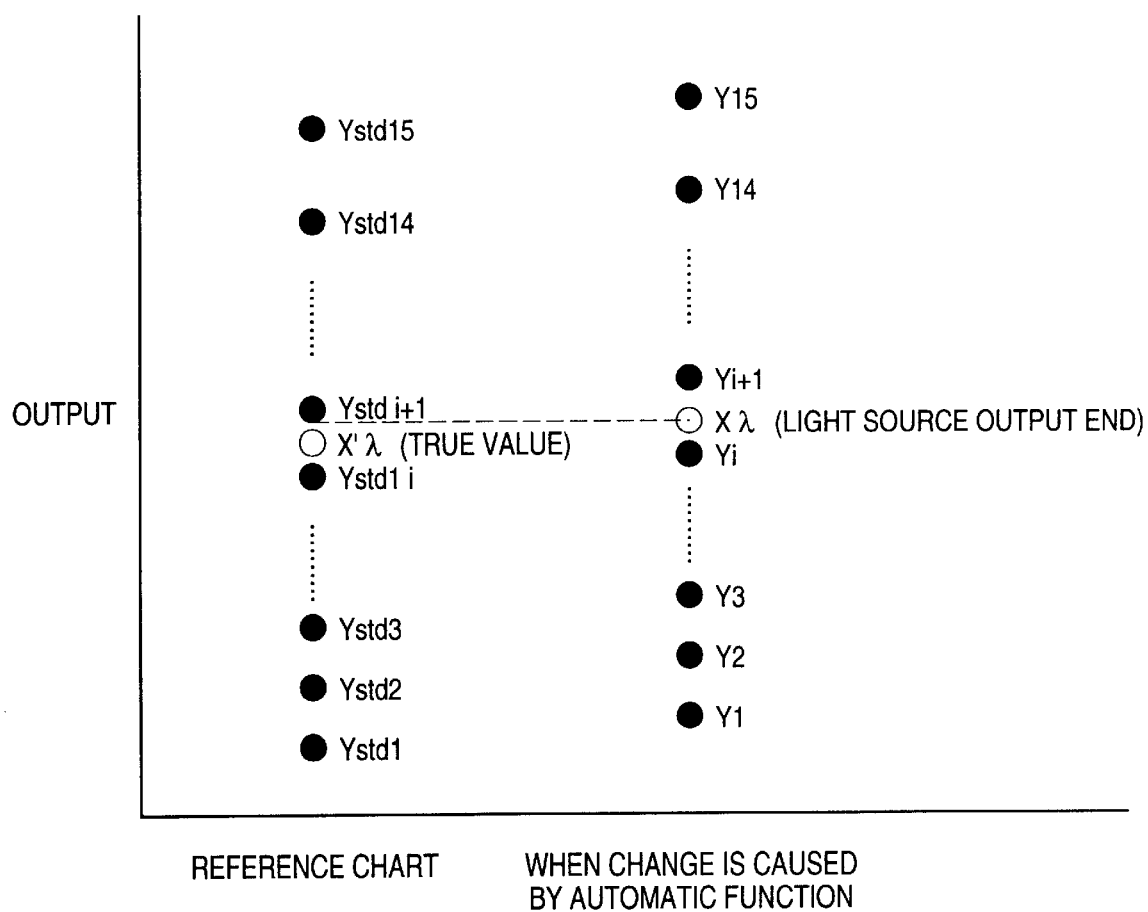
FIG. 35 is a drawing to show the relationships among image data values output by the image pickup machine.

FIG. 35 shows the relationships among the image data values. The correction shown in expression (6) will be discussed with reference to FIG. 35. The relationships among the image data values Yi, Xλ, and Yi+1 shown in FIG. 34 are as shown in FIG. 35. When the values Ystdi+1 and Ystdi of the reference chart are the values shown in FIG. 35, the true value of the image data Xλ should be at the position of X'λ shown in FIG. 35. Therefore, the true value of the image data Xλ can be calculated according to the above-mentioned expression (6).

When output data of the image pickup machine 6 is R, G, and B, a similar correction is made to each of R data, G data, and B data, whereby the true value of the image data of the light output section 4 in each image can be provided and the precise color characteristic of the image pickup machine 6 can be measured.

The embodiment uses the image picked up when the wavelength of output light of the light output section 4 is 580 nm as the reference chart, but if an image picked up when the wavelength is any other than 580 nm or an image picked up with a color chart of any reflectivity inserted in the hole 2 in the test chart shown in the fifteenth embodiment is used as the reference chart and the correction based on the above-mentioned expression (6) is made, a similar advantage can be provided, needless to say.

If the correction is made to the first data provided by the method of the twelfth embodiment, the color characteristic of the image pickup machine 6 can be found; if the correction is made to the second data, the comprehensive color characteristic of the image pickup machine 6 also containing application software can be found.

Seventeenth Embodiment

As a seventeenth embodiment of the invention, a color characteristic measurement method using the above-described color characteristic measurement apparatus for measuring the spectral sensitivity characteristic of an image pickup machine 6 from which the effect of the gradation characteristic of the image pickup machine 6 is excluded will be discussed.

Figure 36:
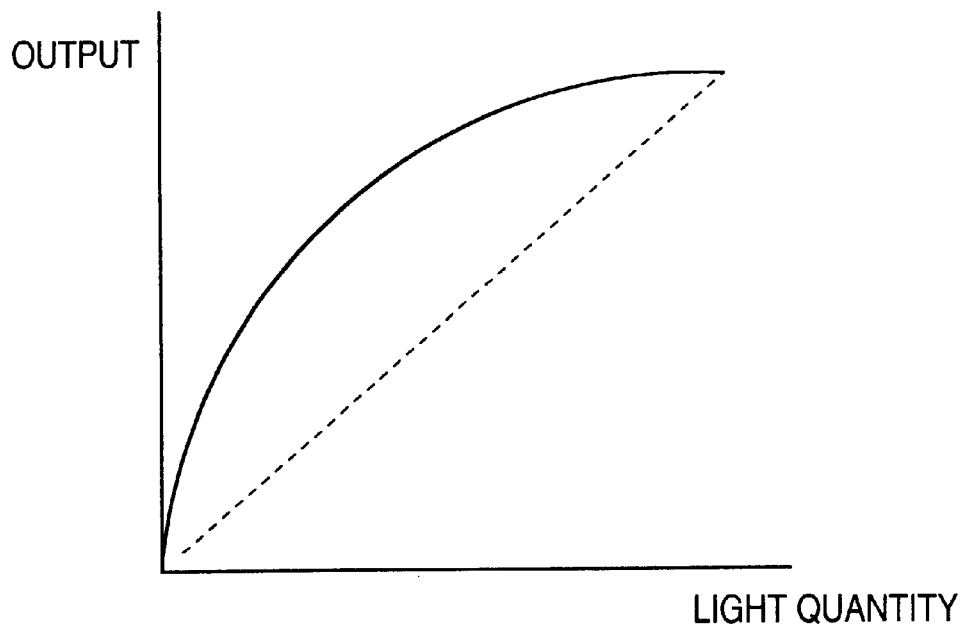
FIG. 36 is a drawing to describe a color characteristic measurement method of a seventeenth embodiment of the invention.

FIG. 36 is a drawing to an example of the gradation characteristic of an image pickup machine, wherein first data is indicated by the solid line and second data is indicated by the dashed line. As indicated by the solid line in the figure, often the gradation characteristic of the image pickup machine 6 is not linear; it is corrected by a characteristic inverse to the gradation characteristic, whereby a linear characteristic as indicated by the dashed line in the figure is provided.

Figure 37:
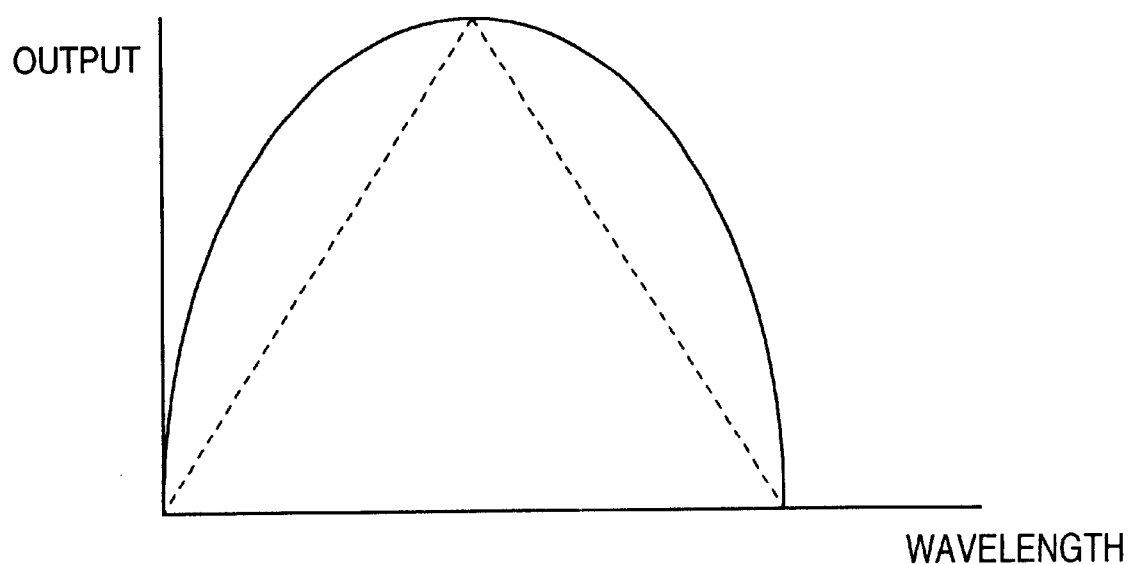
FIG. 37 is a drawing to describe correction of a spectral sensitivity characteristic using a gradation characteristic.

FIG. 37 is a drawing to show a correction example. It shows a spectral sensitivity characteristic. If the gradation characteristic is not linear, namely, the spectral sensitivity characteristic having a characteristic as indicated by the solid line in FIG. 36 becomes a characteristic as indicated by the solid line in FIG. 37. However, it is corrected by the above-mentioned gradation characteristic, whereby the linear spectral sensitivity characteristic indicated by the dashed line in FIG. 37 can be provided.

Figure 38:
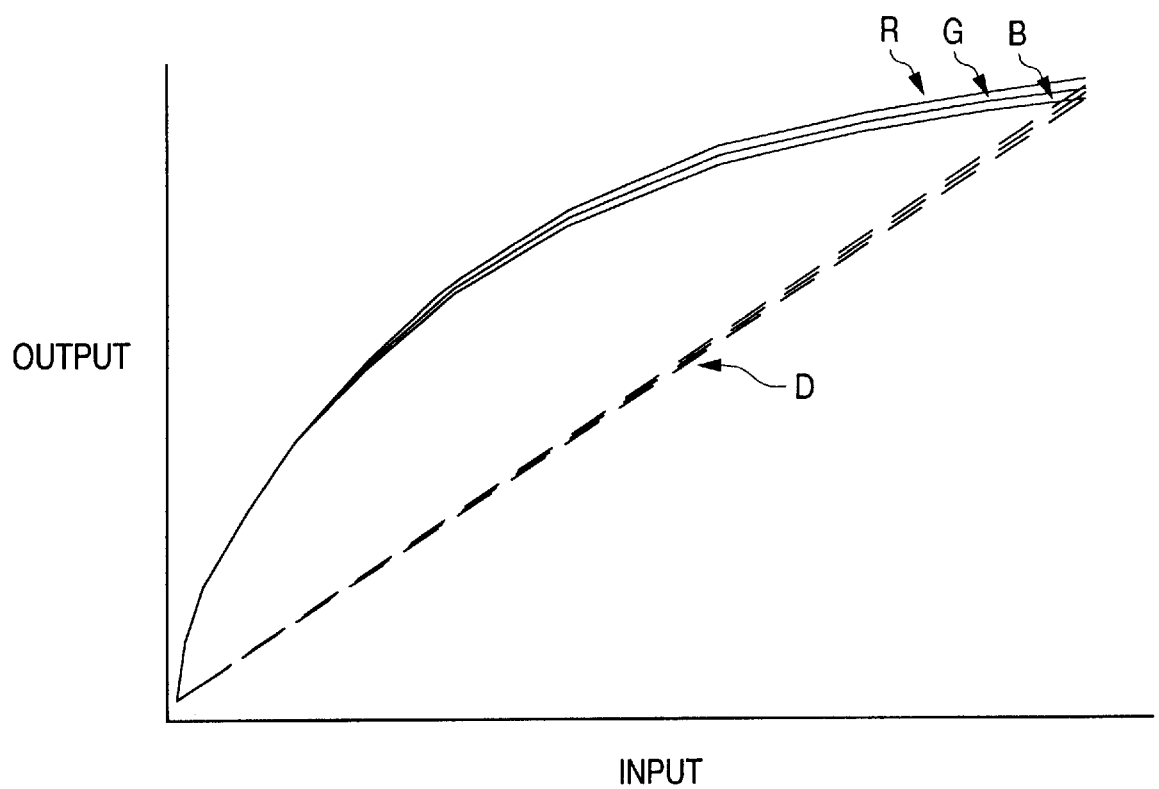
FIG. 38 is a drawing to describe the color characteristic measurement method of the seventeenth embodiment of the invention and is a drawing to show the gradation characteristic of an image pickup machine.
Figure 39:
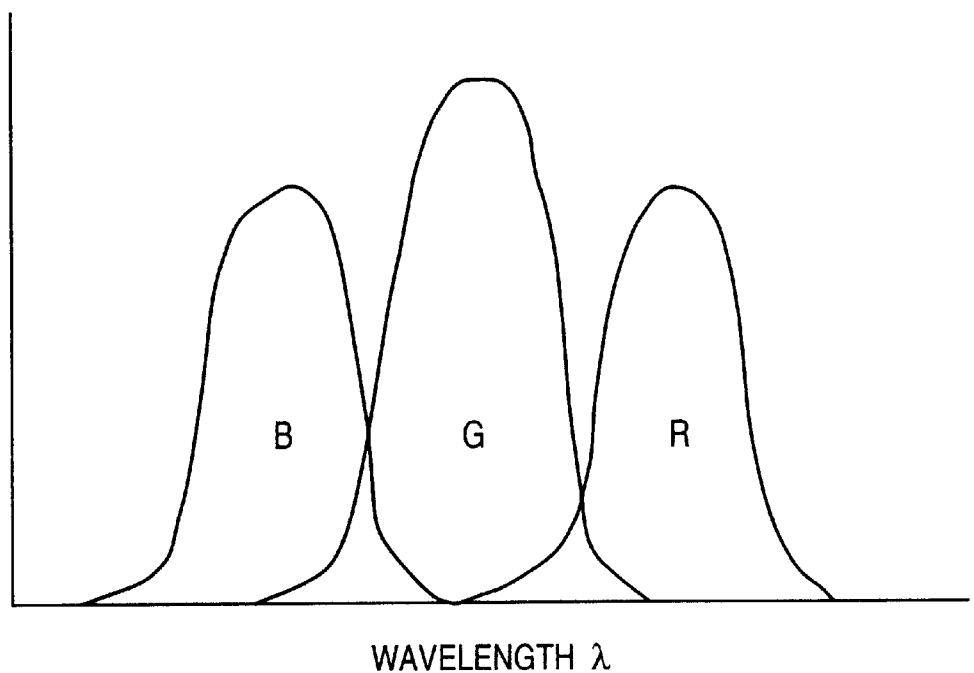
FIG. 39 is a drawing to show the spectral sensitivity characteristic of the image pickup machine measured.
Figure 40:
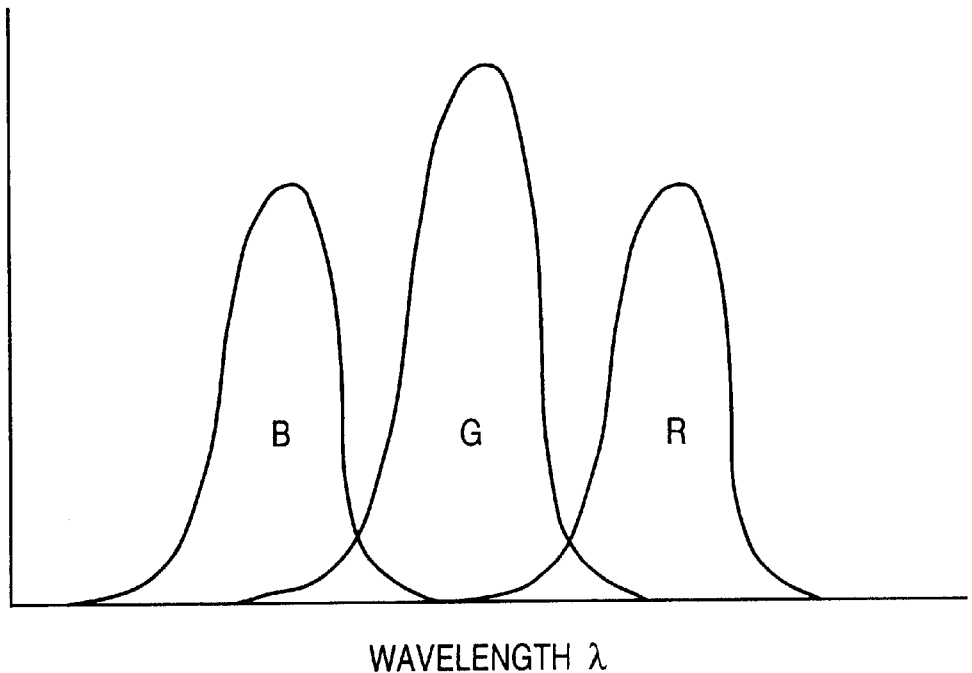
FIG. 40 is a drawing to show the spectral sensitivity characteristic of the image pickup machine with the excluded effect of the gradation characteristic thereof.

The correction will be discussed in more detail. FIG. 38 shows the gradation characteristic of the image pickup machine 6 measured by the measurement method previously described in the fifteenth embodiment. FIG. 39 shows the spectral sensitivity characteristic of the image pickup machine 6 measured by the measurement method previously described in the sixteenth embodiment. The input/output characteristic of the image pickup machine is nonlinear and the corrected linear characteristic is indicated by dashed line D in FIG. 38. Spectral sensitivity measurement is made using output data of the image pickup machine 6 and thus is affected by the gradation characteristic of the image pickup machine 6. Then, to find a linear spectral sensitivity characteristic of the image pickup machine 6 with the excluded effect of the gradation characteristic thereof, the following correction needs to be made:

Gradation characteristic of the image pickup machine 6 shown in FIG. 38, Yc, is represented by the following expression:

$$Yc=fc(Li) \quad (7)$$

where c: R, G, B fc(Li): Function of line indicated by solid line in FIG. 38

Li: Luminance of color chart at imaging time

Letting the measured spectral sensitivity characteristic in FIG. 39 be Sc(λ), linear spectral sensitivity characteristic with the excluded effect of the gradation characteristic of the image pickup machine, Sc'(λ), is found by the following expression:

$$Sc'(\lambda)=fc^{-1}(Sc(\lambda)) \quad (8)$$

where c: R, G, B

Thus, a correction is made to each of R, G, and B image data provided in the sixteenth embodiment as indicated in the following expression:

$$Sc'(\lambda)=kfc^{-1}(X'\lambda-X'0) \quad (9)$$

where k: Coefficient to set the maximum value of Sc(λ) to 100%

X'0: Image data value of color chart having the lowest luminance value provided in the fifteenth embodiment The linear spectral sensitivity characteristic Sc'(λ) is provided by making the correction according to the expression (9).

To use the spectral sensitivity characteristic for color management of color space conversion, etc., it is assumed that the addition law in color metrology is true as a rule. Thus, the advantage in that the linear characteristic is provided as described above is large.

If the correction is made to the first data provided by the method of the twelfth embodiment, the linear spectral sensitivity characteristic of the image pickup machine 6 can be found; if the correction is made to the second data, the linear color characteristic of a system also containing application software can be found.

In the embodiment, the gradation characteristic measured with color chart 2C inserted (fifteenth embodiment) has been described, but the seventeenth embodiment is also applied to the gradation characteristic measured with the output light quantity of light output section 4 changed (fourteenth embodiment).

Measuring the precise spectral sensitivity characteristic of the image pickup machine requires that the light quantity of the spectral light source be constant and that the gradation characteristic of the image pickup machine be linear. Thus, gradation characteristic correction is made and if the light quantity for the spectrum wavelength is not constant, a similar correction is made using the light quantity characteristic relative to the wavelength, whereby the precise spectral sensitivity characteristic of the image pickup machine can be found.

Eighteenth Embodiment

The above-described color characteristic measurement apparatus can be used to find the gradation characteristic and spectral sensitivity characteristic of an image pickup machine 6 by the color characteristic measurement method of any of the twelfth to seventeenth embodiments.

Then, the gradation and spectral sensitivity characteristics are provided in a one-to-one correspondence with the image pickup machines 6 and are managed, whereby if the image pickup machines 6 are machines stable in aging, for example, good use of the gradation and spectral sensitivity characteristics can be made without measuring the color characteristic of each image pickup machine each time a photograph is taken.

To connect the image pickup machine 6 to any other machine to form a system, highly accurate color management in the system is enabled because the gradation and spectral sensitivity characteristics are obvious.

It is described that the gradation and spectral sensitivity characteristics are provided in a one-to-one correspondence with the image pickup machines 6 and are managed. However, if data provided by performing operation on from the gradation characteristic, such as setup level, gamma correction characteristic, and knee-point, and data provided by performing operation on the spectral sensitivity characteristic, such as wavelength at which sensitivity becomes the maximum, half-value wavelength width, and matrix coefficient for conversion to general color space such as XYZ color system, are provided in a one-to-one correspondence with the image pickup machines 6 and are managed in place of or together with the gradation and spectral sensitivity characteristics, it may be advantageous in the point of the data amount or the computation time of the apparatus for receiving an image from the image pickup machine 6 and processing the image; the main purpose and advantages are similar to those described above.

Nineteenth Embodiment

Figure 41:
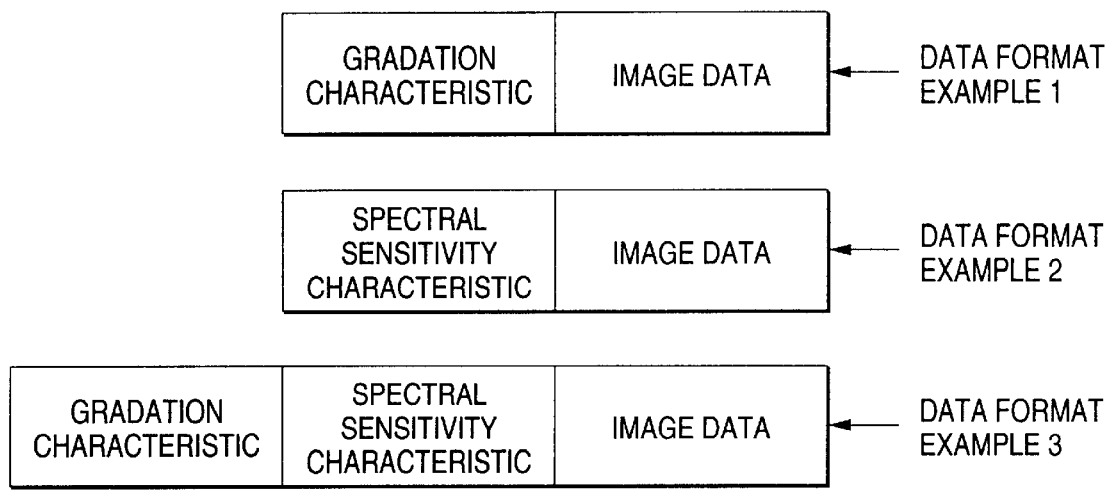
FIG. 41 is a drawing to show data formats according to a nineteenth embodiment of the invention.

Next, FIG. 41 shows the data formats for adding the gradation and spectral sensitivity characteristics of an image pickup machine 6 to image data picked up by the image pickup machine 6.

In FIG. 41, the data format in Example 1 comprises the gradation characteristic added to image data; the data format in Example 2 comprises the spectral sensitivity characteristic added to image data; and the data format in Example 3 comprises the gradation and spectral sensitivity characteristics added to image data.

By using such a data format, what gradation characteristic or spectral sensitivity characteristic the image pickup machine picking up the provided image data has becomes obvious; highly accurate color management is enabled for each image data.

In the nineteenth embodiment, the data format examples for adding both or either of the gradation and spectral sensitivity characteristics to image data are shown. However, as previously described in the eighteenth embodiment, if data provided by performing operation on the gradation characteristic and data provided by performing operation on the spectral sensitivity characteristic are added in place of or together with the gradation and spectral sensitivity characteristics, it may be advantageous in the point of the data amount or the computation time of the apparatus for receiving an image from the image pickup machine 6 and processing the image; the main purpose and advantages are similar to those described above.

In the nineteenth embodiment, the data format examples for adding each characteristic to the top of image data are shown. However, a similar advantage is provided regardless of where the added characteristic is placed in the image data, needless to say.

Twentieth Embodiment

Figure 42:
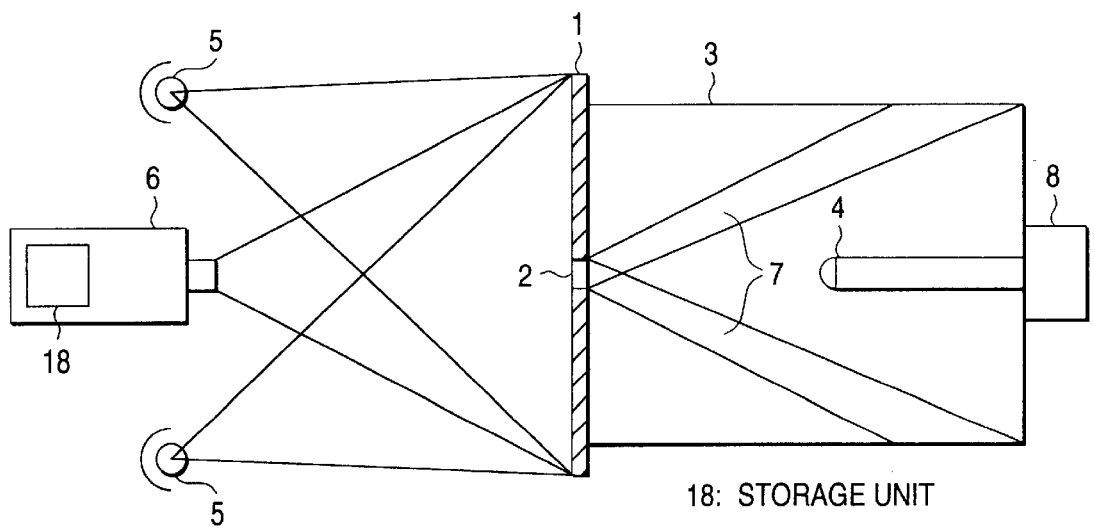
FIG. 42 is a block diagram to show a configuration example of a color characteristic measurement apparatus of a twelfth embodiment of the invention.

FIG. 42 is a block diagram to show a configuration example of a color characteristic measurement apparatus of a twelfth embodiment of the invention. In the figures numeral 18 denotes a storage unit installed in an image pickup machine 6.

The storage unit 18 stores the gradation characteristic or spectral sensitivity characteristic of the image pickup machine 6 found using the color characteristic measurement apparatus by the above-described measurement method. According to such a configuration, the correspondence between the image pickup machines 6 and each characteristic previously described in the eighteenth embodiment becomes clearer and in addition, the data in the nineteenth embodiment can also be prepared easily.

A similar advantage is provided regardless of the type of storage unit 18, such as semiconductor memory, a magnetic disk unit, or an optical disk unit.

Twenty-first Embodiment

Figure 43:
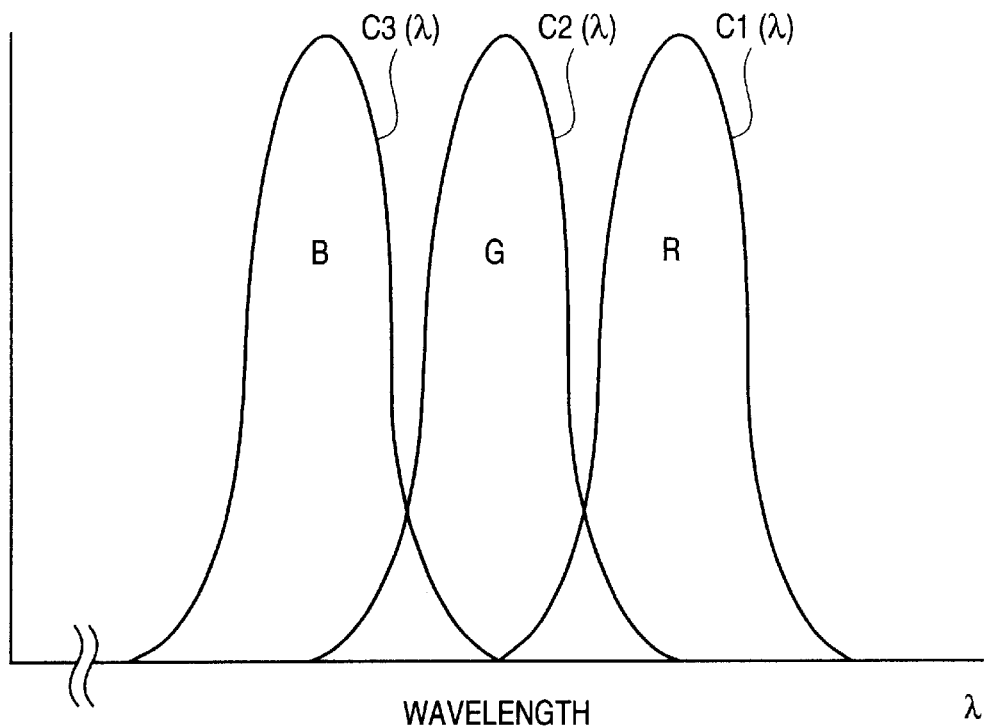
FIG. 43 is a drawing to describe a color management method according to a twenty-first embodiment of the invention.
Figure 44:
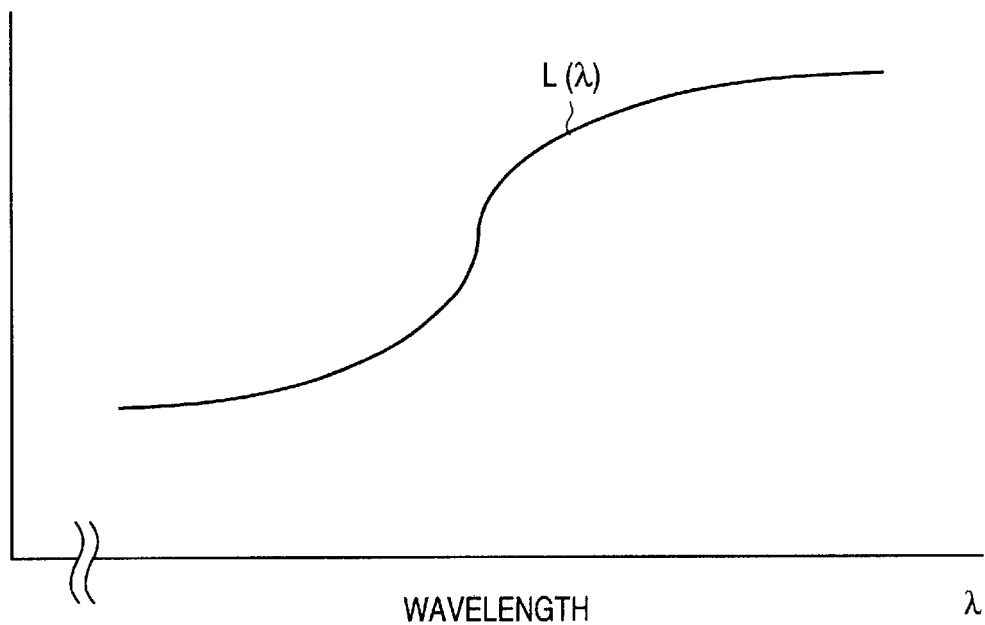
FIG. 44 is a drawing to describe the color management method according to the twenty-first embodiment of the invention.

Let the spectral sensitivity characteristic of an image pickup machine having n channels (n is a natural number) found using the above-described color characteristic measurement apparatus by the above-described measurement method be $Cn(\lambda)$. FIG. 43 shows $Cn(\lambda)$ (n=1, 2, 3 corresponding to R, G, B respectively) of the image pickup machine having three channels of R, G, and B. Let the spectral distribution characteristic of an illumination light source when a subject is imaged by the image pickup machine be $L(\lambda)$ as shown in FIG. 44.

The color characteristic of the image pickup machine 6 can be shown by the spectral sensitivity characteristic $Cn(\lambda)$ (n=1, 2, 3) and the spectral distribution characteristic of the illumination light source, $L(\lambda)$. The characteristic data is added to image data or image data is related to the characteristic data, whereby color management can be executed with the image data provided in a one-to-one correspondence with the color characteristics of the image pickup machines picking up the image data.

Further, color management of color space conversion, etc., can be executed according to the spectral characteristics of three channels provided by multiplying $Cn(\lambda)$ by $L(\lambda)$.

In the twenty-first embodiment, the color management method according to the spectral characteristic is described. However, if color management is executed according to data provided by performing operation on the spectral characteristic, such as wavelength at which the spectral characteristic value becomes the maximum, half-value wavelength width, and matrix coefficient for conversion to general color space such as XYZ color system, the main purpose and advantages are similar to those described above.

In the twenty-first embodiment, the image pickup machine having three color channels is described, but a similar advantage is provided if the number of color channels is changed. That is, with the image pickup machine having n color channels, n+1 characteristic data pieces consisting of spectral sensitivity characteristic $C1(\lambda)$ to $Cn(\lambda)$ and the spectral distribution characteristic of the illumination light source, $L(\lambda)$, are provided and n characteristic data pieces are provided by multiplying $Cn(\lambda)$ by $L(\lambda)$.

Twenty-second Embodiment

In a twenty-second embodiment of the invention, a method of compensating for the difference between the gradation characteristic of an image pickup machine and that of an image output unit and the data format of an image file will be discussed.

FIG. 45A is a drawing to show a configuration example of a system for outputting image data picked up by an image pickup machine 6 to an image output unit 20. FIGS. 45A and 45B are drawings to show examples of γ characteristics of the image output unit 20 and the image pickup machine 6 respectively.

The data of an image picked up by the image pickup machine 6 is transferred to the image output unit 20 as an image file for each image in serial/parallel communication over a cable 21 directly connecting the image pickup machine 6 and the image output unit 20 or via infrared communication 22, a storage medium 23, or the like.

The gradation characteristic of the image pickup machine 6 can be represented by γ coefficient γc as in the following expression:

$$Sout = (Lin)^{1/\gamma c} \quad (10)$$

where Sout is a signal level output from the image pickup machine 6 and Lin is a luminance level of a subject. The gradation characteristic of the image output unit 20 can be represented by γ coefficient γD as in the following expression:

$$Lout = (Sin)^{\gamma D} \quad (11)$$

where Lout is light emission luminance and Sin is an input signal level to the image output unit 20.

Figure 46:
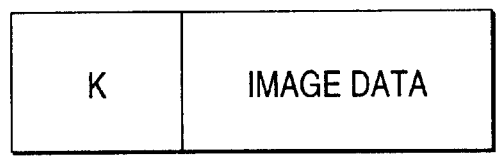
FIG. 46 is a drawing to show data format examples of image files in the twenty-second embodiment of the invention.
Figure 46:
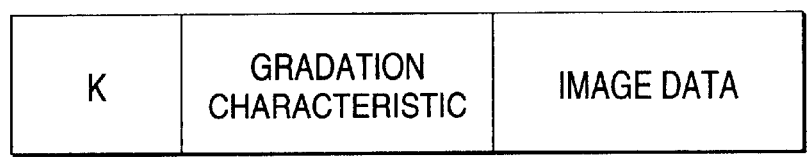

For the gradation characteristic of a subject and that of an output image of the image output unit 20 to match, namely, to set Lin=Lout, the γ coefficient γc of the image pickup machine 6 needs to equal the γ coefficient γD of the image output unit 20. Thus, when γc≠γD, if k·γc is set equal to γD by multiplying γc by coefficient k, Lin=Lout results. The coefficient k is added to the image data provided by the image pickup machine 6. FIG. 46 shows data format examples of image files. The data format in Example 1 comprises the coefficient k added to the top of image data. The data format in Example 2 comprises the coefficient k and the gradation characteristic of the image pickup machine 6 preceding the top of image data. Using such image data, the gradation characteristic difference between the image pickup machine 6 and the image output unit 20 can be compensated on a personal computer, etc., for example.

The data formats shown in FIG. 46 are examples and a similar effect is provided if the coefficient k is added to any part of image data, needless to say.

Figure 45:
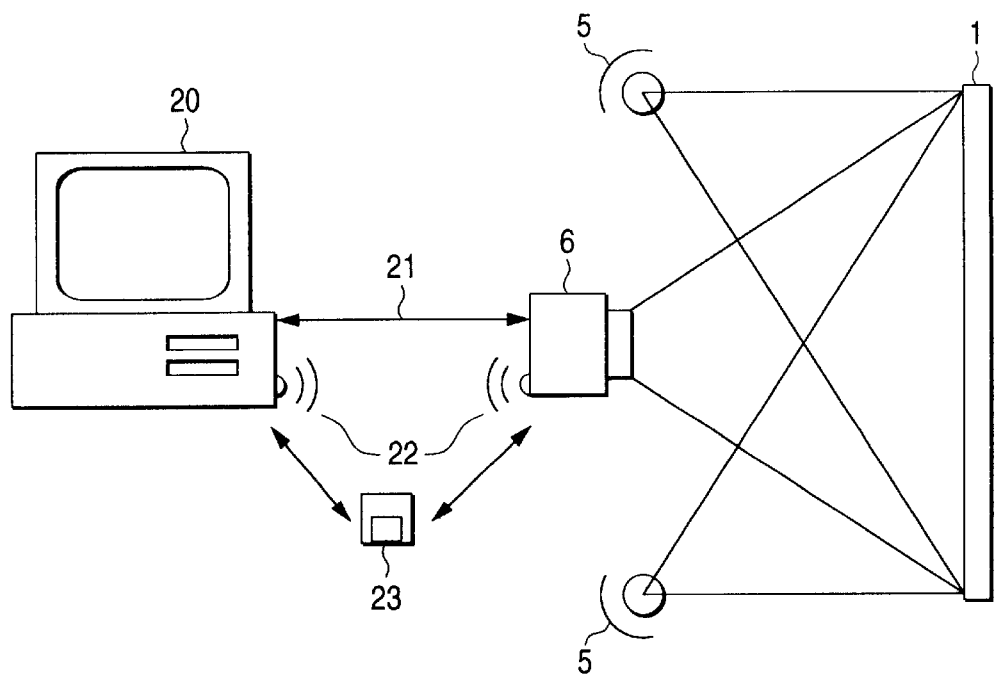
FIG. 45 is a drawing to describe a color characteristic measurement method of a twenty-second embodiment of the invention.
Figure 45:
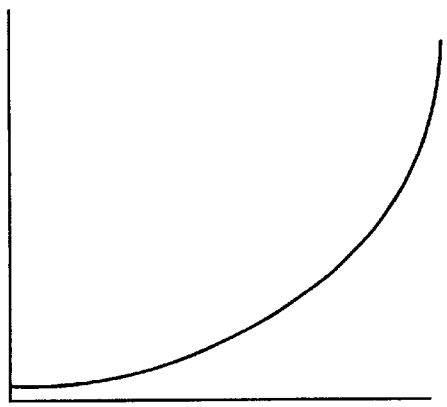
Figure 45:
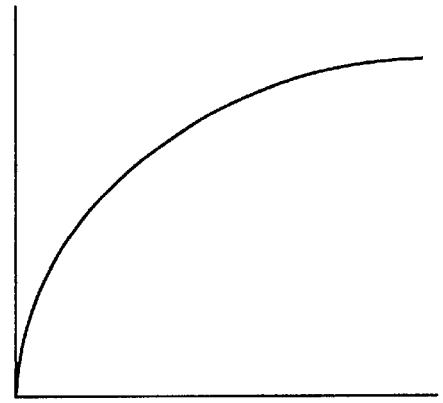

In the embodiment, a personal computer system containing a monitor is shown an example of the image output unit 20 in FIG. 45. However, the embodiment is also applied if the image output unit 20 is a printer, a projector, etc., rather than the monitor.

The gradation characteristic of the image pickup machine 6 can be found by the gradation characteristic measurement method previously described in the fourteenth or fifteenth embodiment. Using the gradation characteristic measured by the method described in the fourteenth or fifteenth embodiment, the precise coefficient k can be calculated and the gradation characteristic difference between the image pickup machine 6 and the image output unit 20 can be eliminated.

Twenty-third Embodiment

In a twenty-third embodiment of the invention, a method of compensating for a color reproduction error and the image file data formats will be discussed.

FIG. 45 is a drawing to show that a subject is imaged by image pickup machine 6 as previously mentioned in the twenty-second embodiment. Assume that the image pickup machine 6 has an image pickup characteristic fitted to the color space of image output unit 20; for example, if the image output unit 20 is an NTSC monitor, the image pickup machine 6 has NTSC image pickup characteristic or if the image output unit 20 has an sRGB space, the image pickup machine 6 has an image pickup characteristic fitted to the sRGB space. A color chart of a known spectral distribution characteristic $\rho(\lambda)$ is placed on a test chart 1. If an illumination light source 5 is reference white defined in the sRGB space, the signals of the color chart provided from the image pickup machine 6 are Rs, Gs, and Bs.

The signals of the color chart, Rc, Gc, and Bc, provided under illumination of spectral distribution characteristic $L(\lambda)$ by the image pickup machine 6 having spectral distribution characteristic $R(\lambda)$, $G(\lambda)$, $B(\lambda)$ are represented by the following expressions:

$$Rc = \int \rho(\lambda) \times R(\lambda) \times L(\lambda) d\lambda \quad (12)$$

$$Gc = \int \rho(\lambda) \times G(\lambda) \times L(\lambda) d\lambda \quad (13)$$

$$Bc = \int \rho(\lambda) \times B(\lambda) \times L(\lambda) d\lambda \quad (14)$$

Figure 47:
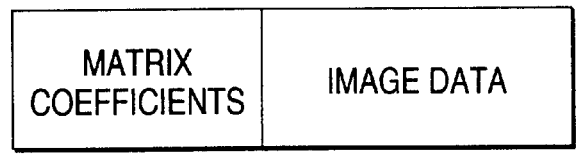
FIG. 47 is a drawing to show data format examples of image files in a twenty-third embodiment of the invention.
Figure 47:
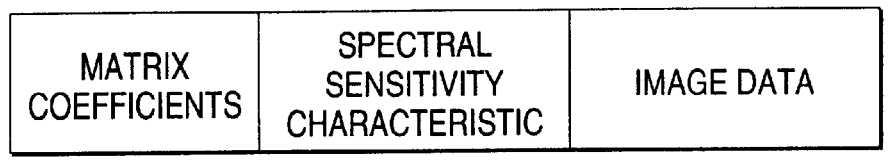
Figure 48:
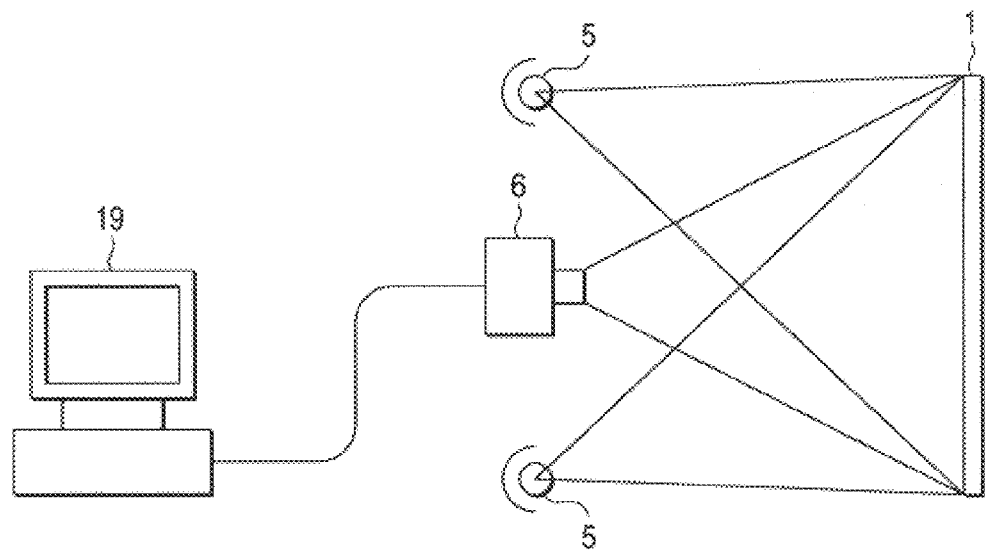
FIG. 48 is a drawing to show a configuration example of a color characteristic measurement apparatus in a related art.
Figure 49:
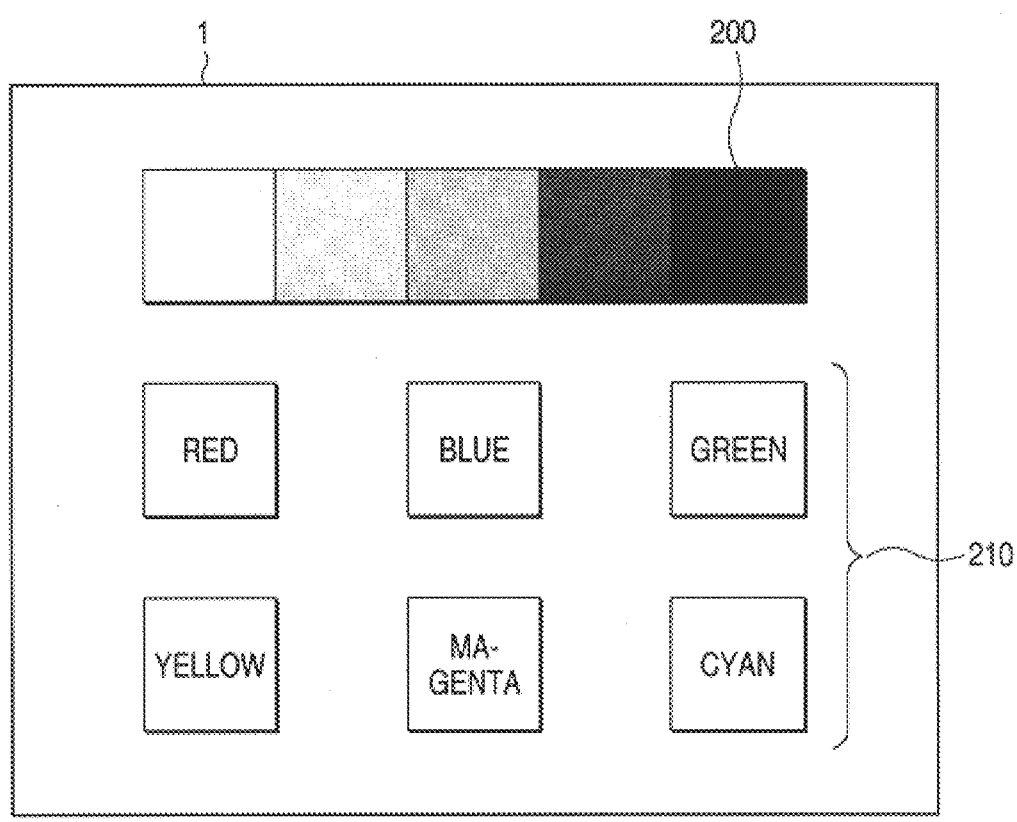
FIG. 49 is a drawing to show an example of a test chart of the color characteristic measurement apparatus shown in FIG. 48.

In all color charts on the subject, if $$Rs = Rc \quad (15)$$

$$Gs = Gc \quad (16)$$

$$Bs = Bc \quad (17)$$

are true, no error is included. If they are not true, a color reproducibility error occurs. To remove this error, the following 3×3 matrix coefficients $$\begin{pmatrix} Rs \\ Gs \\ Bs \end{pmatrix} = \begin{pmatrix} a11 & a12 & a13 \\ a21 & a22 & a23 \\ a31 & a32 & a33 \end{pmatrix} \begin{pmatrix} Rc \\ Gc \\ Bc \end{pmatrix} \quad (18)$$

may be determined. These coefficients can be found by at least three types of typical color charts. The nine matrix coefficients of a11 to a33 are added to the image data provided by the image pickup machine 6. FIG. 47 shows data format examples of image files. The data format in Example 1 comprises the matrix coefficients added to the top of image data. The data format in Example 2 comprises the matrix coefficients and the spectral sensitivity characteristic of the image pickup machine 6 preceding the top of image data. The nine matrix coefficients of a11 to a33 are added to image file, whereby a color reproduction error can be compensated on a personal computer, etc., for example.

The data formats shown in FIG. 47 are examples and a similar effect is provided if the matrix coefficients are added to any part of image data, needless to say.

The spectral sensitivity characteristic of the image pickup machine 6 can be measured by the measurement method previously described in the sixteenth embodiment. Using the spectral sensitivity characteristic corrected by the method described in the seventeenth or eighteenth embodiment, the precise matrix coefficients can be calculated and the color reproducibility error can be eliminated.

If the spectral distribution characteristic of a light source, $L(\lambda)$, is a characteristic estimated from the light source type, correlated color temperature, etc., there is no problem on practical use. In this case, however, the standard spectral distribution characteristic corresponding to the light source type needs to be obvious, and a spectral distribution characteristic involving no problem on practical use is found by correcting the standard spectral distribution characteristic according to the correlated color temperature. Resultantly, for the spectral distribution characteristic of a light source, $L(\lambda)$, highly accurate color management can be easily realized with less information.

What is claimed is:

1. A color characteristic measurement apparatus of an image pickup machine, comprising
   a test chart as a subject to which applied light is applied from a front side;
   a black box being placed on a rear face of said test chart and formed on an inner surface in black;
   holes being made in said test chart and said black box; and
   a light output section being placed in said black box at a position where said light output section can be observed through said holes from the front of said test chart.

2. The color characteristic measurement apparatus of an image pickup machine as claimed in claim 1 further including means for changing a light quantity of light emitted from said light output section.

3. The color characteristic measurement apparatus of an image pickup machine as claimed in claim 1 further including spectrum means for making light from a light source a spectrum, wherein said light output section emits the spectrum provided by said spectrum means.

4. The color characteristic measurement apparatus of an image pickup machine as claimed in claim 3 wherein the light emitted from said light output section is light changed in specific wavelength steps in a specific wavelength range.

5. The color characteristic measurement apparatus of an image pickup machine as claimed in claim 4 wherein the specific wavelength step in which the light emitted from said light output section is changed is roughly equal to a half-value width of the light emitted from said light output section.

6. The color characteristic measurement apparatus of an image pickup machine as claimed in claim 1 further including a filter having a specific spectral transmittance characteristic, placed in front of said light output section.

7. The color characteristic measurement apparatus of an image pickup machine as claimed in claim 1 further including an external light source and an optical waveguide device for guiding light from said external light source into said light output section in said black box.

8. The color characteristic measurement apparatus of an image pickup machine as claimed in claim 1 further including a diffuser panel being placed in front of said light output section for diffusing light.

9. The color characteristic measurement apparatus of an image pickup machine as claimed in claim 1 further including an illumination light source being placed in front of said test chart for illuminating said test chart at a position where said illumination light source does not apply light to said light output section through said hole in said test chart.

10. The color characteristic measurement apparatus as claimed in claim 1 further including:
    a second illumination light source being placed in front of said test chart for applying light to said light output section through said hole in said test chart, wherein output light from said light output section and light which is applied from said second illumination light source and reflected on said light output section are emitted through said hole.

11. The color characteristic measurement apparatus as claimed in claim 6 further including: an illumination light source being placed in front of said test chart for applying light to said filter through said hole in said test chart, wherein output light from said light output section and light which is applied from said illumination light source and reflected on said filter are emitted through said hole.

12. The color characteristic measurement apparatus as claimed in claim 6 further including: an illumination light source being placed in front of said test chart for applying light to said diffuser panel through said hole in said test chart, wherein output light from said light output section and light which is applied from said illumination light source and reflected on said diffuser panel are emitted through said hole.

13. The color characteristic measurement apparatus as claimed in claim 1, wherein one color chart or a plurality of color charts different in reflectivity are placed on said test chart.

14. The color characteristic measurement apparatus as claimed in claim 1, wherein one color chart or a plurality of color charts different in chromaticity are placed on said test chart.

15. The color characteristic measurement apparatus as claimed in claim 1, wherein a hole through which said light output section in said black box cannot be observed is made in said test chart.

16. The color characteristic measurement apparatus as claimed in claim 1, wherein a reference white color chart is placed in the proximity of said hole in said test chart.

17. A color characteristic measurement method of an image pickup machine, comprising the steps of:
    placing a color characteristic measurement apparatus as claimed in claim 1 and a first illumination light source so that light applied from the first illumination light source is not applied to a light output section in a black box;
    imaging a test chart of the color characteristic measurement apparatus by the image pickup machine; and
    finding a color characteristic of the image pickup machine based on first data corresponding to the area of the light output section, extracted from picked up image data or second data provided by performing operation on the first data.

18. A color characteristic measurement method of an image pickup machine, comprising the steps of:
    placing a color characteristic measurement apparatus as claimed in claim 13 and a first illumination light source so that light applied from the first illumination light source is not applied to a light output section in a black box;

imaging a test chart of the color characteristic measurement apparatus by the image pickup machine; and correcting first data corresponding to the area of the light output section, extracted from picked up image data or second data provided by performing operation on the first data based on image data corresponding to the portion of one color chart or portions of a plurality of color charts different in reflectivity placed on the test chart.

19. A color characteristic measurement method of an image pickup machine, comprising the steps of:

placing a color characteristic measurement apparatus as claimed in claim 14 and a first illumination light source so that light applied from the first illumination light source is not applied to a light output section in a black box;

imaging a test chart of the color characteristic measurement apparatus by the image pickup machine; and correcting first data corresponding to the area of the light output section, extracted from picked up image data or second data provided by performing operation on the first data based on image data corresponding to the portion of one color chart or portions of a plurality of color charts different in chromaticity placed on the test chart.

20. A color characteristic measurement method of an image pickup machine, comprising the steps of:

placing a color characteristic measurement apparatus as claimed in claim 2 and a first illumination light source so that light applied from the first illumination light source is not applied to a light output section in a black box;

changing the light quantity of light emitted through a hole in a test chart of the color characteristic measurement apparatus;

imaging the test chart by the image pickup machine, and finding a gradation characteristic of the image pickup machine based on first data corresponding to the area of the light output section, extracted from picked up image data or second data provided by performing operation on the first data.

21. A color characteristic measurement method of an image pickup machine, comprising the steps of:

placing a color characteristic measurement apparatus as claimed in claim 1 and a first illumination light source so that light applied from the first illumination light source is not applied to a light output section in a black box;

changing the wavelength of a spectrum emitted through a hole in a test chart of the color characteristic measurement apparatus;

imaging the test chart by the image pickup machine, and finding a spectral sensitivity characteristic of the image pickup machine based on first data corresponding to the area of the light output section, extracted from picked up image data or second data provided by performing operation on the first data.

22. The color characteristic measurement method as claimed in claim 21, wherein a characteristic relative to the wavelength of the light quantity of the emitted spectrum is found and the spectral sensitivity characteristic of the image pickup machine is corrected based on the found characteristic.

23. The color characteristic measurement method as claimed in claim 21, wherein the light quantity of light emitted through the hole in the test chart of the color characteristic measurement apparatus is changed, the test chart is imaged by the image pickup machine, a gradation characteristic of the image pickup machine is found based on first data corresponding to the area of the light output section, extracted from picked up image data or second data provided by performing operation on the first data, and a spectral sensitivity characteristic of the image pickup machine is corrected based on the found characteristic.

24. In a color characteristic measurement apparatus as claimed in claim 13 wherein N color charts different in reflectivity (N is an integer of 2 or more) are placed on a test chart, to change the light quantity of emitted light, pick up images in sequence by an image pickup machine, and find a gradation characteristic of the image pickup machine, a color characteristic measurement method comprising the steps of:

adopting a first image picked up when the emitted light is of a specific light quantity as a reference image;

adopting a part corresponding to an area of a light output section in a second image picked up when the emitted light is of any other light quantity as first data;

finding a first color chart of the N color charts with data in the second image greater than and closest to the first data;

finding a second color chart of the N color charts with data in the second image smaller than and closest to the first data;

correcting the first data based on data of the parts corresponding to the first and second color charts in the first and second images to find second data; and finding the gradation characteristic of the image pickup machine from the second data at each image picking up time.

25. In a color characteristic measurement apparatus as claimed in claim 13 wherein N color charts different in reflectivity (N is an integer of 2 or more) are placed on a test chart, to insert the color charts into a hole in the test chart one at a time in order, pick up an image for each color chart by an image pickup machine, and find a gradation characteristic of the image pickup machine, a color characteristic measurement method comprising the steps of:

adopting a first image picked up when a specific color chart is inserted into the hole as a reference image;

in a second image picked up when any other color chart is inserted into the hole, adopting a part corresponding to an area of the inserted color chart as first data;

finding a first color chart of the N color charts with data in the second image greater than and closest to the first data;

finding a second color chart of the N color charts with data in the second image smaller than and closest to the first data;

correcting the first data based on data of the parts corresponding to the first and second color charts in the first and second images to find second data; and finding the gradation characteristic of the image pickup machine from the second data at each image picking up time.

26. In a color characteristic measurement apparatus as claimed in claim 13 wherein N color charts different in reflectivity (N is an integer of 2 or more) are placed on a test chart, to change light emitted from a light output section in specific wavelength steps in a specific wavelength range, pick up images in order by an image pickup machine, and find a spectral characteristic of the image pickup machine, a color characteristic measurement method comprising the steps of:

adopting a first image picked up when the emitted light is of a specific wavelength as a reference image;

adopting a part corresponding to an area of an inserted color chart in a second image picked up when the emitted light is of any other wavelength as first data;

finding a first color chart of the N color charts with data in the second image greater than and closest to the first data;

finding a second color chart of the N color charts with data in the second image smaller than and closest to the first data;

correcting the first data based on data of the parts corresponding to the first and second color charts in the first and second images to find second data; and finding the spectral characteristic of the image pickup machine from the second data at each image picking up time.

27. The color characteristic measurement method as claimed in claim 26 wherein an inverse function of a gradation characteristic of the image pickup machine is found and a linear spectral characteristic of the image pickup machine is found through the inverse function.

28. Data transmitting apparatus for transmitting a spectral sensitivity characteristic or correction data therefor, the spectral sensitivity characteristic being obtained by the color characteristic measurement apparatus of claim 1.

29. Data recording apparatus for recording a spectral sensitivity characteristic or correction data therefor, the spectral sensitivity characteristic being obtained by the color characteristic measurement apparatus of claim 1.

30. Data reproducing apparatus for reproducing a spectral sensitivity characteristic or correction data therefor, the spectral sensitivity characteristic being obtained by the color characteristic measurement apparatus of claim 1.

31. Data transmitting apparatus for transmitting a spectral sensitivity characteristic or correction data therefor, the spectral sensitivity characteristic being obtained by the color characteristic measurement method of claim 17.

32. Data recording apparatus for recording a spectral sensitivity characteristic or correction data therefor, the spectral sensitivity characteristic being obtained by the color characteristic measurement method of claim 17.

33. Data reproducing apparatus for reproducing a spectral sensitivity characteristic or correction data therefor, the spectral sensitivity characteristic being obtained by the color characteristic measurement method of claim 17.

* * * * *